(12) United States Patent
Park et al.

(10) Patent No.: US 10,252,204 B2
(45) Date of Patent: Apr. 9, 2019

(54) FILTER CLEANING DEVICE AND AIR CONDITIONER HAVING THE SAME

(71) Applicant: Samsung Electronics Co., Ltd, Gyeonggi-do (KR)

(72) Inventors: Hyun Uk Park, Gyeonggi-do (KR); Wan-Ku Kang, Gyeonggi-do (KR); Chan Young Park, Gyeonggi-do (KR); Geon Hee Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 15/146,849

(22) Filed: May 4, 2016

(65) Prior Publication Data
US 2016/0325217 A1  Nov. 10, 2016

(30) Foreign Application Priority Data
May 4, 2015  (KR) .................. 10-2015-0062533

(51) Int. Cl.
| | | |
|---|---|---|
| *B01D 46/00* | (2006.01) | |
| *F24F 13/28* | (2006.01) | |
| *B01D 46/10* | (2006.01) | |
| *F25B 13/00* | (2006.01) | |
| *F24F 3/16* | (2006.01) | |

(52) U.S. Cl.
CPC ......... *B01D 46/0065* (2013.01); *B01D 46/10* (2013.01); *F24F 13/28* (2013.01); *F25B 13/00* (2013.01); *F24F 2003/1639* (2013.01); *F24F 2221/22* (2013.01)

(58) Field of Classification Search
CPC .... B01D 46/00; B01D 46/0065; B01D 46/10; F24F 13/28; F24F 2003/1639; F24F 2221/22; F25B 13/00

USPC ..................................................... 55/295–300
See application file for complete search history.

(56) References Cited

U.S. PATENT DOCUMENTS

2009/0211284 A1* 8/2009 Yabu ................... F24F 1/0007
62/259.1

FOREIGN PATENT DOCUMENTS

| | | |
|---|---|---|
| EP | 2 141 421 A1 | 1/2010 |
| EP | 2 233 854 A1 | 9/2010 |
| EP | 2 267 375 A1 | 12/2010 |
| JP | 2004-245448 | 9/2004 |
| JP | 2012-032080 | 2/2012 |

(Continued)

OTHER PUBLICATIONS

Communication Pursuant to Article 94(3) EPC for European Application No. 16167734.9, dated Sep. 25, 2017. (4 pages).

(Continued)

*Primary Examiner* — T. Bennett McKenzie

(57) ABSTRACT

An air conditioner including a suction inlet configured to suction air, a filter movably arranged at one side of the suction inlet, a first dust elimination member provided within a movement section of the filter to eliminate dust thereof by coming in contact with the filter when the filter is moved and a second dust elimination member provided adjacent to one side of the first dust elimination member to eliminate dust collected at the first dust elimination member, wherein the first dust elimination member is reversely rotated with respect to a movement direction of the filter to come in contact with the second dust elimination member, thereby eliminating the dust collected at the first dust elimination member.

20 Claims, 31 Drawing Sheets

(56) References Cited

FOREIGN PATENT DOCUMENTS

| | | | |
|---|---|---|---|
| JP | 2012032080 A * | 2/2012 | ............... F24F 1/00 |
| JP | 2012-112550 | 6/2012 | |
| KR | 10-0828336 | 5/2008 | |
| KR | 10-2014-0100017 | 8/2014 | |
| WO | 2010150520 A1 | 12/2010 | |
| WO | 2012096119 A1 | 7/2012 | |

OTHER PUBLICATIONS

European Patent Office, "European Search Report," in connection with Application No. 16167734.9-1602 dated Sep. 15, 2016, 8 pages, publisher EPO, Munich, Germany.
Communication under Rule 71(3) EPC dated Sep. 27, 2018 in connection with European Patent Application No. 16 167 734.9, 54 pages.

* cited by examiner

FILTER CLEANING DEVICE AND AIR CONDITIONER HAVING THE SAME

CROSS-REFERENCE TO RELATED APPLICATION(S) AND CLAIM OF PRIORITY

The present application is related to and claims the benefit of Korean Patent Application No. 10-2015-0062533, filed on May 4, 2015 in the Korean Intellectual Property Office, the disclosure of which is incorporated herein by reference.

TECHNICAL FIELD

Embodiments of the present disclosure relates to a filter cleaning device and an air conditioner, and more particularly, to a structural improvement of a filter of an air conditioner.

BACKGROUND

Generally, an air conditioner is an apparatus for controlling a temperature, a humidity, an air current and distribution, and the like suitable for a human activity using a cooling cycle while simultaneously eliminating dust from air. Major components for the cooling cycle include a compressor, a condenser, an evaporator and the like.

The condenser and the evaporator change a phase of a refrigerant through a heat exchange with outside air, and cooling or heating is performed using heat exchanged in the phase change of the refrigerant.

Here, to promote heat exchange in the condenser and the evaporator, a suction inlet through which outside air passes is provided in the vicinity of the condenser and the evaporator, and a filter is additionally provided to eliminate dust from outside air suctioned through the suction inlet.

If an air conditioner including a filter continuously operates, foreign material may be accumulated in the filter while outside air is passing therethrough which obstructs an inflow of the outside air. A filter cleaning device for cleaning the foreign material accumulated on the filter is provided to prevent such an accumulation.

Recently, a filter cleaning device for automatically cleaning a filter is provided and is configured to continuously separate dust attached to the filter therefrom using a brush. Due to a continuous operation of the brush, however, dust attaches to the brush and efficiency of filter cleaning degrades.

Also, the problem of the filter cleaning device described above occurs not only in an air conditioner but also in other equipment including a filter.

SUMMARY

To address the above-discussed deficiencies, it is a primary object to provide a filter cleaning device having an improved structure so as to increase cleaning efficiency of a filter, and an air conditioner having the same.

One or more one embodiment of the present disclosure also provide a filter cleaning device having an improved structure so as to effectively eliminate dust collected by the filter cleaning device, and an air conditioner having the same.

According to an aspect of an embodiment of the present disclosure, there is provided an air conditioner including a suction inlet configured to suction air, a filter movably arranged at one side of the suction inlet, a first dust elimination member provided within a movement section of the filter to eliminate dust thereof by coming in contact with the filter when the filter is moved and a second dust elimination member provided adjacent to one side of the first dust elimination member to eliminate dust collected at the first dust elimination member, wherein the first dust elimination member is reversely rotated with respect to a movement direction of the filter to come in contact with the second dust elimination member, thereby eliminating the dust collected at the first dust elimination member.

The air conditioner further including a dust elimination cover spaced apart from the first dust elimination member to cover one side of the first dust elimination member and including one side which is opened, wherein the second dust elimination member is provided at an inside surface of the dust elimination cover.

The filter is reciprocally moved between a first position and a second position, and the dust elimination cover is sealed by coming in contact with one side of the filter when the filter arrives at the second position.

The filter includes teeth corresponding to a length of one lateral side of the filter and provided in a length direction of the one lateral side thereof, wherein the air conditioner further comprises a driving gear configured to engage with the teeth to deliver power to reciprocally move the filter.

The filter includes a protrusion configured to protrude toward the one side of the filter to allow the filter, which has moved, to come in contact with the one side of the dust elimination cover, thereby sealing the dust elimination cover.

The filter includes a protrusion configured to protrude toward the one side of the filter to allow the filter, which has moved, to come in contact with the one side of the dust elimination cover, thereby sealing the dust elimination cover.

The movement direction of the filter is changed when the protrusion and the one side of the dust elimination cover come in contact with each other.

After the protrusion and the one side of the dust elimination cover come in contact with each other, the first dust elimination member is reversely rotated with respect to the movement direction of the filter to come in contact with the second dust elimination member.

The air conditioner further including a pivot member pressurized by one side of the filter when the filter is moved to perform a rotational movement; and a switch member pressurized by one side of the pivot member being rotationally moved to be operated only when the filter is moved.

The pivot member includes a pivot shaft, a delivery portion pressurized by the one side of the filter to deliver a rotational force to the pivot member and an operating portion configured to pressurize and operate the switch member when the pivot member is rotated, the filter includes a pressurizing portion configured to protrude toward the filter from a position corresponding to the operating portion to pressurize the operating portion when the filter is reciprocally moved.

The air conditioner further including a filter cleaning device comprising a discharge outlet configured to discharge dust collected by the second dust elimination member to an outside of the filter cleaning device.

The second dust elimination member is provided to extend in a diagonal direction with respect to a rotational axis of the first dust elimination member, and, when rotated, the first dust elimination member sequentially comes in contact with one end of the second dust elimination member to the other end thereof to eliminate dust.

According to an aspect of another embodiment of the present disclosure, there is provided a unitary air conditioner including a suction inlet configured to suction outside air, a filter arranged at the suction inlet, a ventilation device configured to discharge air to an outside and a filter cleaning device configured to clean the filter by moving the filter, the filter cleaning device includes a first dust elimination member provided within a movement section of the filter to come in contact therewith when the filter is moved to eliminate dust of the filter and a second dust elimination member arranged adjacent to one side of the first dust elimination member to eliminate dust collected at the first dust elimination member, the first dust elimination member is moved in a direction spaced apart from the filter and comes in contact with the second dust elimination member to eliminate the dust collected at the first dust elimination member, and the first dust elimination member includes a discharge passage configured to connect the ventilation device to the filter cleaning device so as to move dust collected by the second dust elimination member to the ventilation device, thereby discharging the dust to an outside of the filter cleaning device.

The ventilation device is configured to discharge the dust collected by the second dust elimination member with air in an indoor space through the discharge passage to the outside of the unitary air conditioner when operated in an indoor air discharge mode.

The unitary air conditioner further including a dust collector provided at one side of the discharge passage to collect the dust discharged from the filter cleaning device.

The filter cleaning device further includes a dust elimination cover spaced apart from the first dust elimination member to cover one side thereof, the first dust elimination member is provided to be rotatable, the second dust elimination member is arranged at an inner circumferential surface of the dust elimination cover in a diagonal direction with respect to a length direction of the dust elimination cover, and the second dust elimination member comes in contact with the first dust elimination member being reversely rotated with respect to a movement direction of the filter to eliminate the dust collected at the first dust elimination member.

The filter cleaning device further includes a frame configured to form a section at which the filter is moved, the filter is provided as two filters arranged toward a center of the filter from both ends of the frame, and the first dust elimination member is located between the two filters to alternately come in contact with the two filters being reciprocally moved.

The dust elimination cover is provided in a length direction corresponding to a height direction of the frame, and includes an opening formed by opening portions of both ends of the dust elimination cover and a side thereof toward the filter, the opening is closed by one side of the filter when a movement of the filter from one side of the frame to the other side thereof is completed, and the first dust elimination member is rotated after the opening is closed.

The filter further includes teeth provided in a reciprocal movement direction of the filter, the filter cleaning device further includes a driving member configured to move the filter, and the driving member includes teeth, a driving gear provided to correspond to the teeth to engage therewith and a motor configured to deliver a rotational force to the driving gear.

According to an aspect of another embodiment of the present disclosure, there is provided a filter cleaning device configured to clean a filter by moving the filter including a frame configured to form a section at which the filter is moved, a driving member configured to move the filter from one side of the frame to the other side thereof, a brush located at an inward side of the frame and arranged within a section of a reciprocal movement of the filter to eliminate dust of the filter by coming in contact with the filter when the filter is moved and a dust elimination rib spaced apart from the brush to eliminate dust collected at the brush, the brush is provided to be rotatable, and the dust elimination rib comes in contact with the brush being rotated to eliminate the dust collected at the brush when a movement of the filter to the other side of frame is completed.

The filter cleaning device and the air conditioner having the same of the present disclosure are capable of automatically eliminating dust from a filter using a brush of the filter cleaning device to separate the eliminated dust from the filter without user intervention, and thereby efficiency of filter cleaning can be improved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Hereinafter, embodiments according to the present disclosure will be described in detail with reference to the accompanying drawings.

Figure 2:
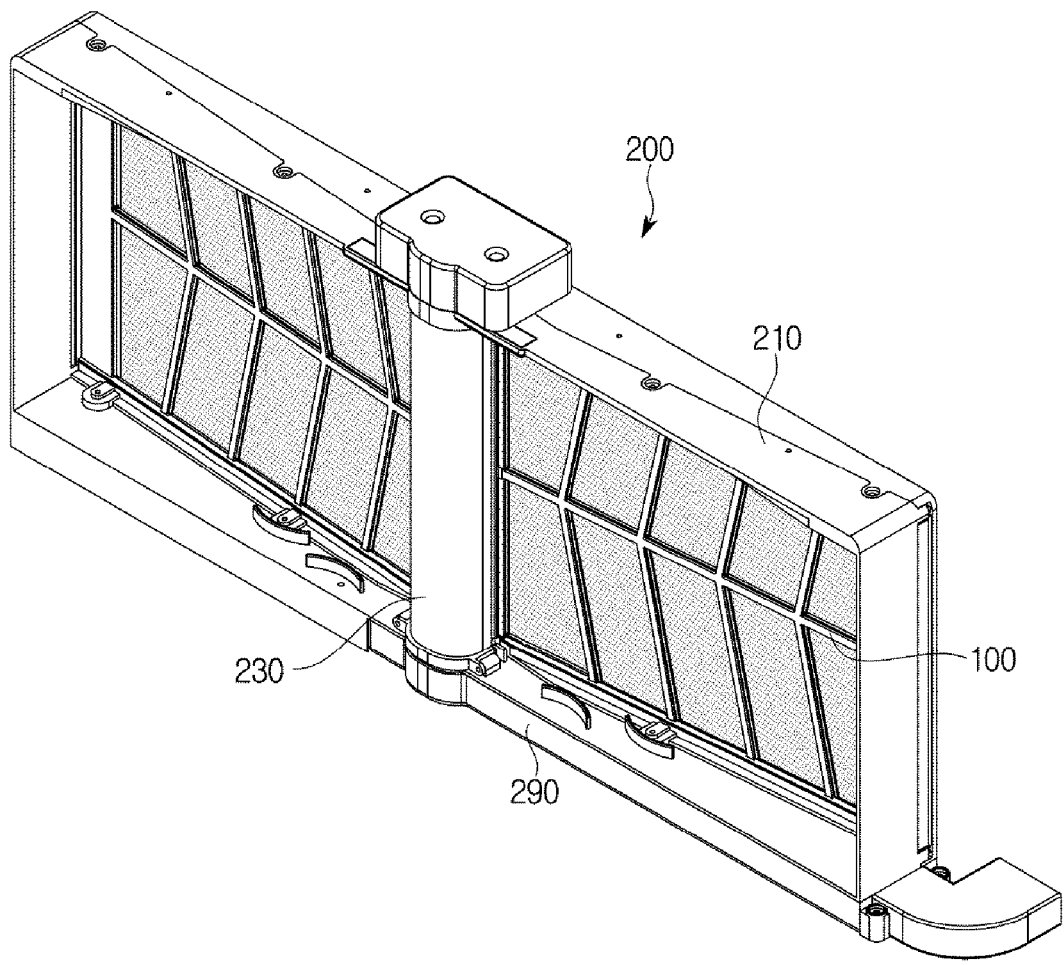
FIG. 2 illustrates a filter and a filter cleaning device of an air conditioner according to various embodiments of the present disclosure.
Figure 3:
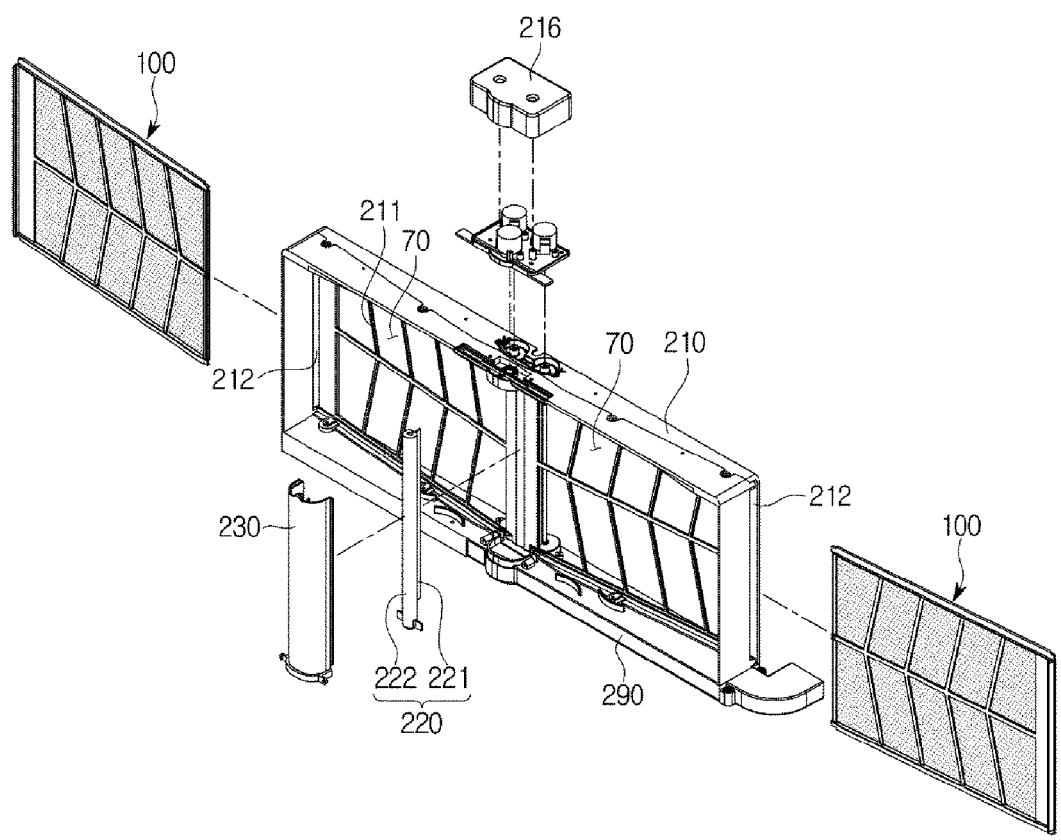
FIG. 3 illustrates a configuration of a part of a filter and a filter cleaning device of an air conditioner according to various embodiments of the present disclosure.

The terms "front surface" and "front side" be used below refers to a direction toward a front surface and a front side as seen from in front on the basis of a filter cleaning device 200 shown in FIG. 2, whereas the term "rear side" used below refers to a direction toward a rear side of the filter cleaning device 200.

The filter cleaning device 200 according to one embodiment of the present disclosure may be installed at an air conditioner 1 including a filter. Also, in addition to the air conditioner 1, the filter cleaning device 200 may be installed at a dehumidifier, a humidifier and the like which include a filter. Hereinafter, the filter cleaning device 200 will be described under the assumption that the filter cleaning device 200 is installed at a device including a filter such as the air conditioner 1.

Figure 1:
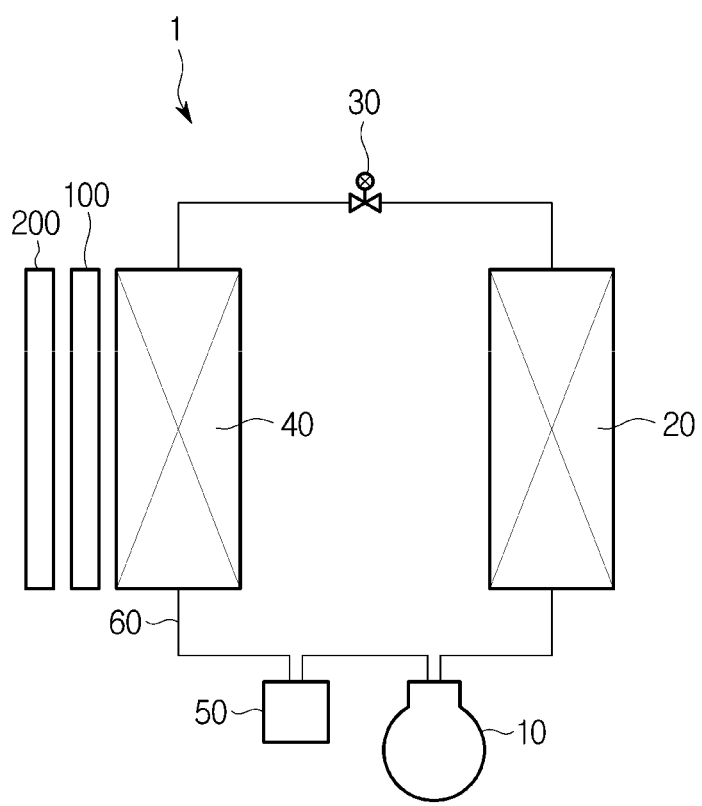
FIG. 1 illustrates a refrigerant cycle of an air conditioner according to various embodiments of the present disclosure.

FIG. 1 is a view illustrating a refrigerant cycle of an air conditioner according to one embodiment of the present disclosure.

A cooling cycle of the air conditioner 1 includes a compressor 10, a condenser 20, an expansion valve 30, and an evaporator 40. The cooling cycle may circulate through a series of processes including compression-condensation-expansion-evaporation and may supply conditioned air to an indoor space after a heat exchange with a refrigerant.

The compressor 10 compresses and discharges a refrigerant gas under high temperature and high pressure, and the discharged refrigerant gas flows into the condenser 20. The condenser 20 condenses the compressed refrigerant into a liquid phase and radiates heat into an ambient space through the condensation process.

The expansion valve 30 expands the liquid phase refrigerant, which is under high temperature and high pressure and was condensed in the condenser 20, into a liquid phase refrigerant under low pressure. The evaporator 40 evaporates the refrigerant expanded in the expansion valve 30. The evaporator 40 achieves a cooling effect through a heat exchange with an object to be cooled using a latent heat of evaporation and returns the refrigerant gas under low temperature and low pressure to the compressor 10.

The air conditioner 1 may include an accumulator 50 for separating a liquid refrigerant from a mixed vapor-liquid refrigerant passing through the evaporator 40 to allow a vapor refrigerant to flow into the compressor 10. The air conditioner 1 may condition air inside the indoor space through a refrigerant pipe 60 which connects these devices to form a single closed loop.

When the air conditioner 1 operates in a cooling mode, an outdoor unit of the air conditioner 1 is configured with the compressor 10 and the condenser 20 of the cooling cycle. The expansion valve 30 may be provided at one of an indoor unit and the outdoor unit, and the evaporator 40 may be provided at the indoor unit.

When the air conditioner 1 operates in a heating mode, the air conditioner 1 may reverse a flow direction of the refrigerant to control the condenser 20 to serve as the evaporator 40 and the evaporator 40 to serve as the condenser 20.

The evaporator 40 (in the heating mode, serving as the condenser) provided at the indoor unit may exchange heat with indoor air suctioned inside the indoor unit, and then discharge the heat exchanged indoor air subjected to an outward side of the outdoor unit.

Therefore, a suction inlet 70 serving as a passage into which air is suctioned may be provided at the indoor unit, and a filter 100 may be provided at the suction inlet 70 to eliminate dust from air suctioned through the suction inlet 70 so as to discharge clean air.

The filter 100 may include a filter frame 110 having an incised portion through which air passes, and a mesh member 120 provided at the incised portion.

The filter 100 may collect dust contained in indoor air, and the collected dust may restrict a flow of air and cause degradation of a performance of the air conditioner and a sanitary problem thereof.

Consequently, the filter cleaning device 200 for eliminating dust collected in the filter 100 may be provided at one side of the filter 100.

However, the embodiment of the present disclosure is not limited thereto, and the filter cleaning device 200 may be provided at the outdoor unit if necessary. In other words, an additional filter 100 may be provided at a suction inlet through which suctioned air passes to be heat exchanged with the condenser 20 located at the outdoor unit, and the filter cleaning device 200 may be provided at one side of the filter 100 to eliminate dust from air suctioned into the outdoor unit.

Hereinafter, the filter cleaning device 200 will be described in detail.

As shown in FIGS. 2 to 5, the filter cleaning device 200 may include a frame 210 on which the filter 100 is seated, a first dust elimination member 220 configured to eliminate dust of the filter 100, a dust elimination cover 230 configured to cover the first dust elimination member 220, a driver 250 configured to move the filter 100, and a discharge passage 290 configured to discharge dust collected at the dust elimination cover 230 to an outside of the filter cleaning device 200.

The frame 210 may be provided in a tetragonal frame shape including an open space. The open space may form a passage through which air may pass, and preferably, may be provided at least equal to or greater than that of the suction inlet 70.

Two filters 100 may be seated at an inside surface of the frame 210. However, the embodiment of the present disclosure is not limited thereto, and a single filter 100 may be seated at the inside surface of the frame 210 and also three or more filters 100 may be seated at the inside surface thereof.

A filter seating portion 211 at which the filter 100 is seated may be included at the inside surface of the frame 210.

The filter seating portion 211 may be provided as two portions corresponding to the two filters 100 and in shapes the same as that of the filters 100.

The filter seating portion 211 may be diagonally provided at the inside surface of the frame 210. In other words, the filter seating portion 211 may be provided to form a predetermined angle with respect to a long side of the inside surface from both ends in a center direction.

By diagonally seating the filter 100, an area of the filter 100 in contact with air is expanded and the amount of dust collected is much larger in comparison to when the filter is seated in parallel with the long side of the inside surface.

Recessed grooves may be included at upper and lower sides of the filter seating portion 211 to support the filter 100. Therefore, the filter 100 may be seated at and fixed to the recessed grooves before being moved.

The filter 100 may be inserted into a lateral surface portion of the frame 210 through an insertion inlet 212 provided at both lateral surfaces of the frame 210 and be assembled therein.

The frame 210 may include a rack and pinion seating portion 213 at which a rack and pinion portion 223 configured to drive the first dust elimination member 220 is seated, and a driver seating portion 214 at which the driver 250 is seated.

The rack and pinion seating portion 213 may be provided at an upper side of the frame 210, and the rack and pinion portion 223 may be seated at the upper side thereof to guide a movement of a pinion 223*b*.

The driver seating portion 214 includes a first driver seating portion 214*a* provided at the upper side of the frame 210, and a second driver seating portion 214*b* provided at a lower side of the frame 210.

The driver seating portion 214 may include a space in which a pair of driving gears 251 are seated, and a hole through which a driving shaft 252 penetrates, wherein the pair of driving gears 251 are configured to move the filter 100 by engaging with teeth 130 provided at a rear surface of the filter 100, and the driving shaft 252 is configured to connect the pair of driving gears 251, which are vertically provided, to each other.

The first driver seating portion 214*a* may include a space in which a pivot member 260 and a switch member 270, which will be described, are additionally seated.

The dust elimination cover 230 may be seated at the lower side of the frame 210, and the lower side of the frame 210 may include a dust discharge hole 215 which is incised so as to discharge dust collected at the dust elimination cover 230 to the outward side of the filter cleaning device 200.

The dust discharge hole 215 may be provided to be open downward to connect to the discharge passage 290 provided at the lower side of the frame 210.

The discharge passage 290 may be provided in a pipe shape through which dust may be moved. One side of the discharge passage 290 may be provided to be coupled to a dust collector (not shown) separably provided so a user may remove dust easily, and may be coupled to a passage (not shown) for discharging the dust to the outside.

Figure 4A:
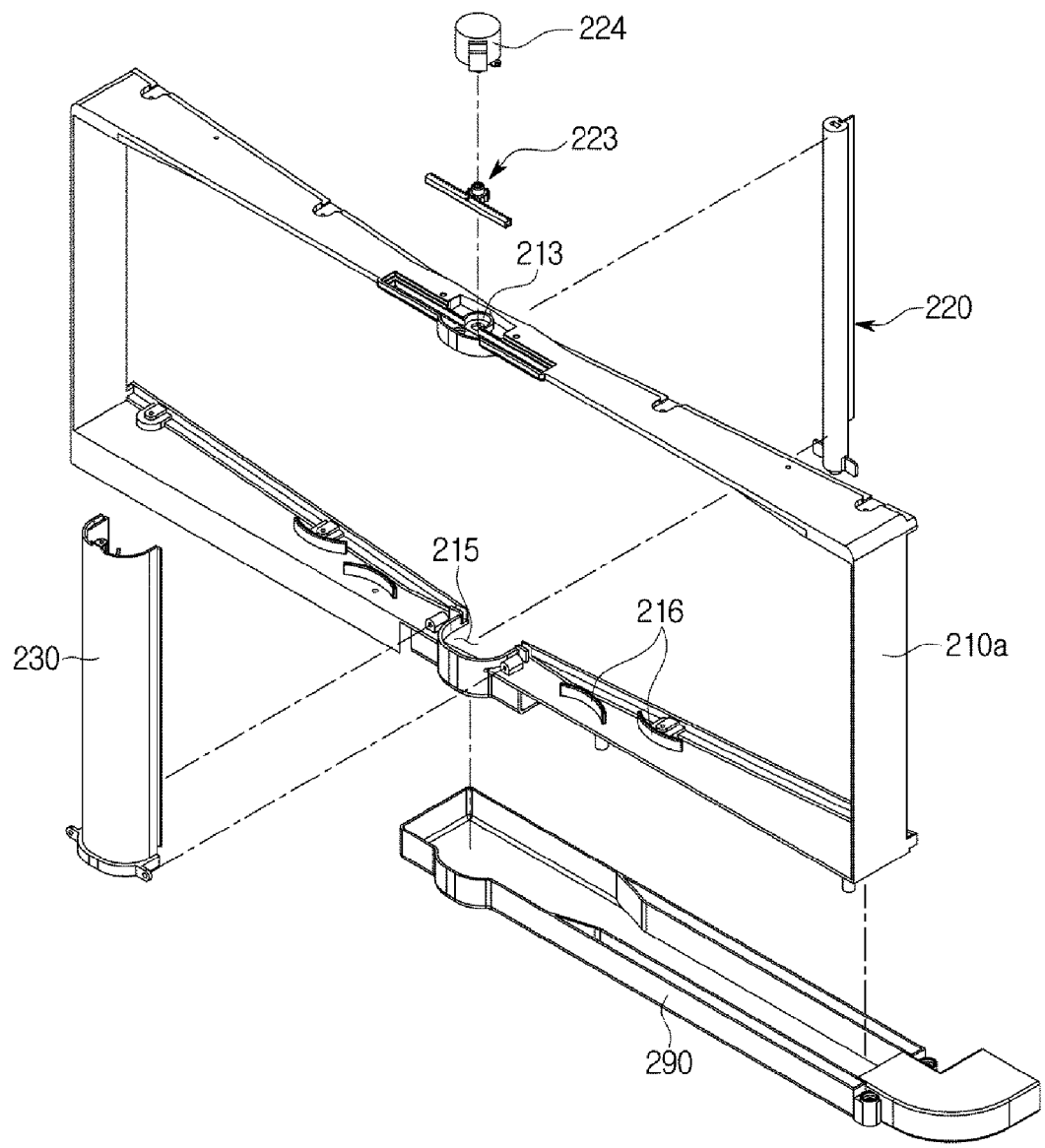
FIG. 4a illustrates a configuration of a part of a filter cleaning device of an air conditioner according to various embodiments of the present disclosure.
Figure 4B:
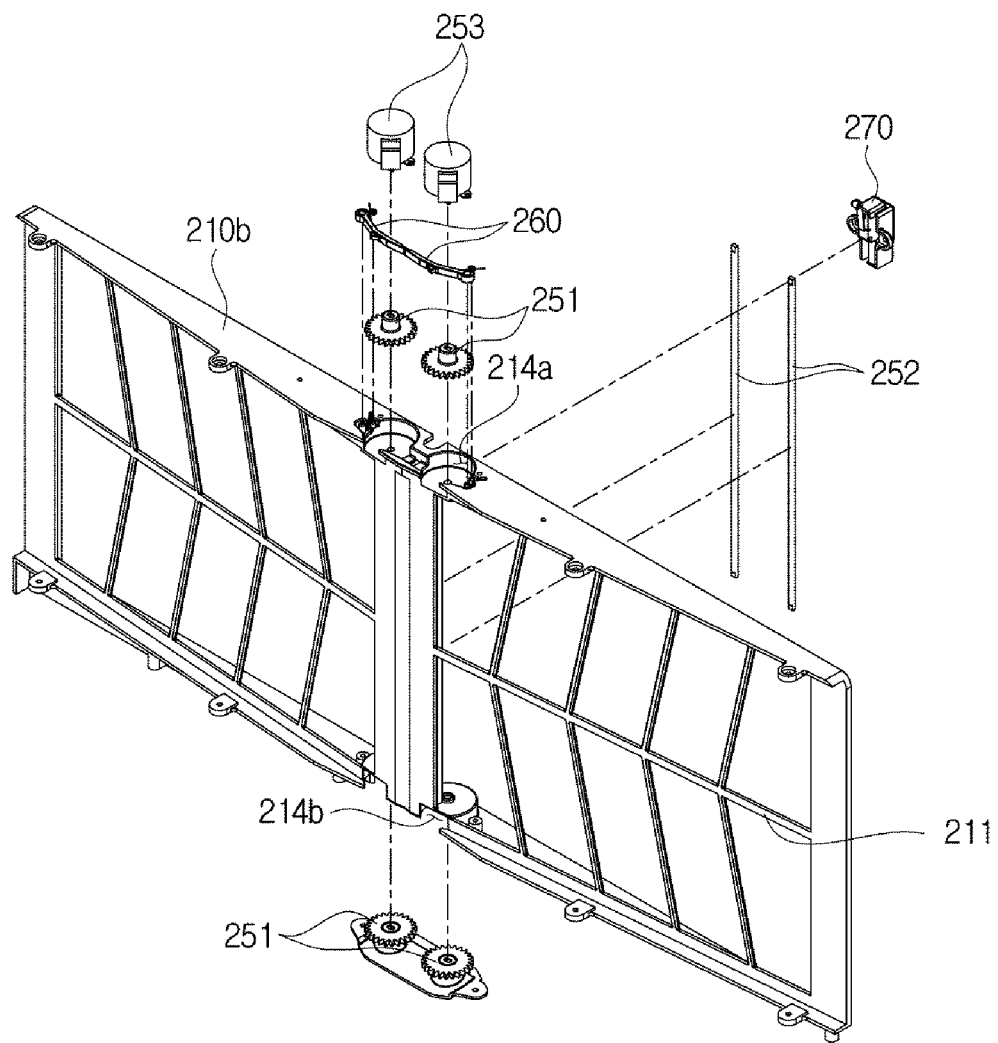
FIG. 4b illustrates a configuration of a part of a filter cleaning device of an air conditioner according to various embodiments of the present disclosure.
Figure 5:
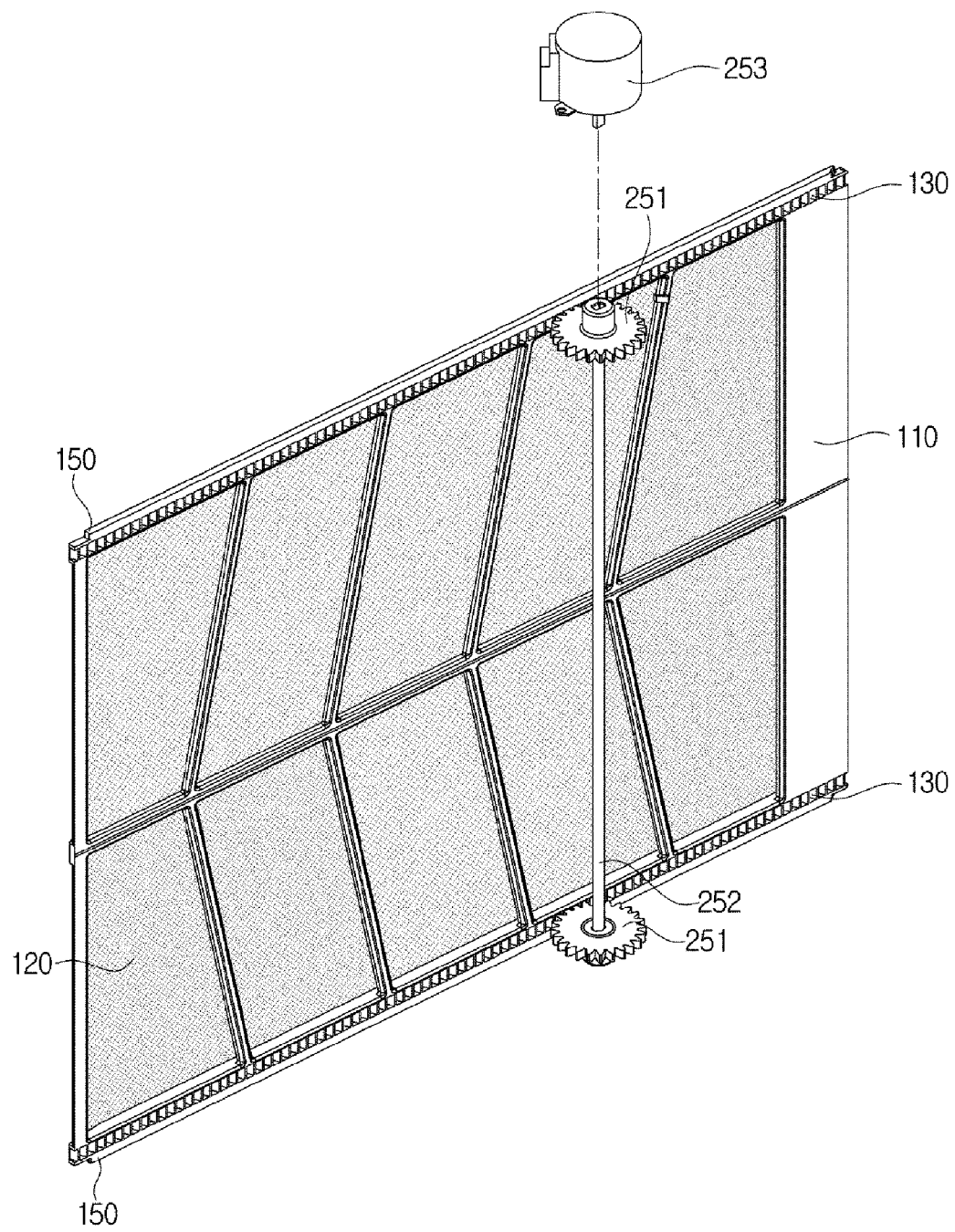
FIG. 5 illustrates a configuration of a part of a filter and a driver of an air conditioner according to various embodiments of the present disclosure.

As shown in FIGS. 4A and 4B, the frame 210 may be provided to be assembleable by being divided into a first frame 210a and a second frame 210b so components disposed at the inward side of the frame 210 may be easily assembled.

The rack and pinion seating portion 213 and the dust discharge hole 215 may be provided at the first frame 210a. In addition, the first dust elimination member 220, the dust elimination cover 230, and the discharge passage 290 may be assembled.

The driver seating portion 214 and the filter seating portion 211 may be provided at the second frame 210b. In addition, the driver 250 may be assembled.

At the upper side of the frame 210, a first drive motor 224 for driving the rack and pinion portion 223 and a second drive motor 253 for driving the driving gears 251 and the driving shaft 252 may be provided. In particular, the first drive motor 224 may be disposed corresponding to the rack and pinion seating portion 213, and the second drive motor 253 may be disposed corresponding to the first driver seating portion 214a.

A protection cover 217 which protects the first and second drive motors 224 and 253 may be provided at an upper side thereof.

Hereinafter, a movement principle of the filter 100 will be described. The two filters 100 are symmetrically provided and a movement principle may be identically applicable to both of them, so a movement of only the filter 100 disposed at one side will be described.

As shown in FIGS. 5 to 8, the filter 100 may be moved in the inward side of the frame 210 to reciprocally move.

As described above, the teeth 130 may be provided at the rear surface of the filter 100 in a length direction thereof to engage with the driving gears 251. The driving gears 251 may be rotated by a rotational force generated from the second drive motor 253 connected thereto, and thus the teeth 130 may be slid according to the rotation of the driving gears 251 to move of the filter 100.

The filter 100 may be provided in a diagonal direction based on the long side of the inside surface of the frame 210 to advance along the diagonal direction toward a front side thereof.

The two filters 100 may not be moved simultaneously, and alternately, the filter 100 disposed at the one side may be moved forward and backward and thereafter, the filter 100 disposed at the other side may be moved forward and backward.

Figure 6A:
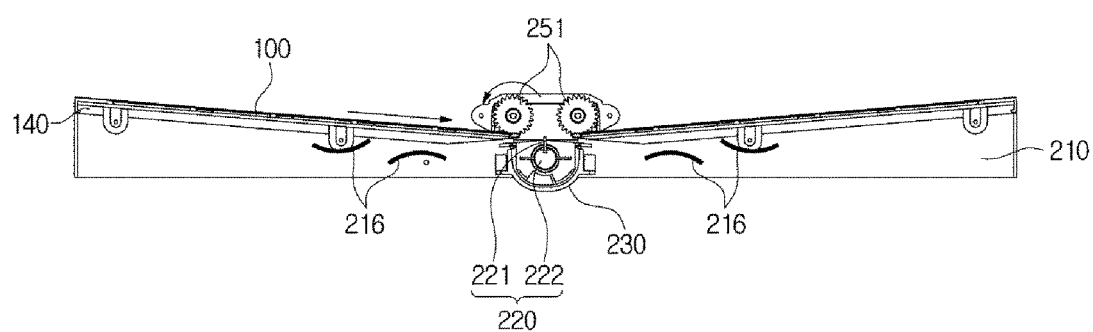
FIG. 6a illustrates a configuration of a part of a filter and a filter cleaning device of an air conditioner according to various embodiments of the present disclosure.
Figure 6B:
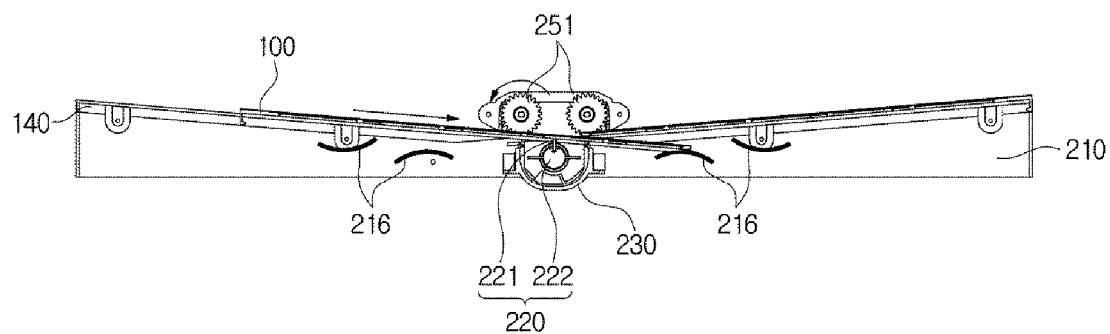
FIG. 6b illustrates a configuration of a part of a filter and a filter cleaning device of an air conditioner when the filter is moved partly according to various embodiments of the present disclosure.
Figure 6C:
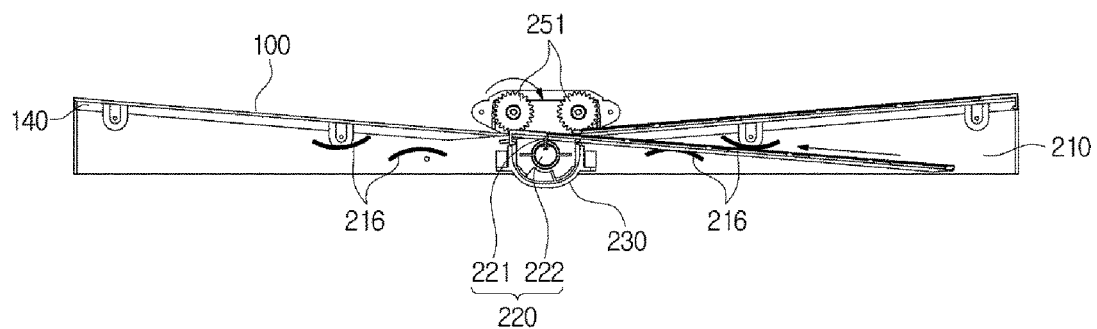
FIG. 6c illustrates a configuration of a part of a filter and a filter cleaning device of an air conditioner when the filter is moved to an one side of a frame according to various embodiments of the present disclosure.

The filter 100 provided at the one side (a left side) shown in FIG. 6A may be moved forward in the diagonal direction as shown in FIG. 6B, and thereafter, may be moved to the other side of the frame 210 as shown in FIG. 6C.

In particular, a protrusion 140 in a hook shape may be provided at one end of the filter 100 adjacent to the both lateral surfaces of the frame 210, and the filter 100 may be moved forward until the protrusion 140 comes in contact with one side of the dust elimination cover 230 and is coupled thereto.

Consequently, a maximum distance which the filter 100 is movable toward the other side may be a distance from an initial position of the protrusion 140 to a position at which the protrusion 140 is moved to come in contact with the dust elimination cover 230.

When the filter 100 is located at the other side, the second drive motor 253 may generate a reverse rotational force and rotate the driving gears 251 in a reverse direction to move the filter 100 backward, thereby moving the filter 100 to a position at which the filter 100 was seated as shown in FIG. 6A.

When a reciprocal movement of the filter 100 located at the one side is completed, the filter 100 located at the other side (a right side) may be moved from the other side of the frame 210 to the one side thereof according to the same principle described above, and then may be returned to the original seated position.

Figure 7:
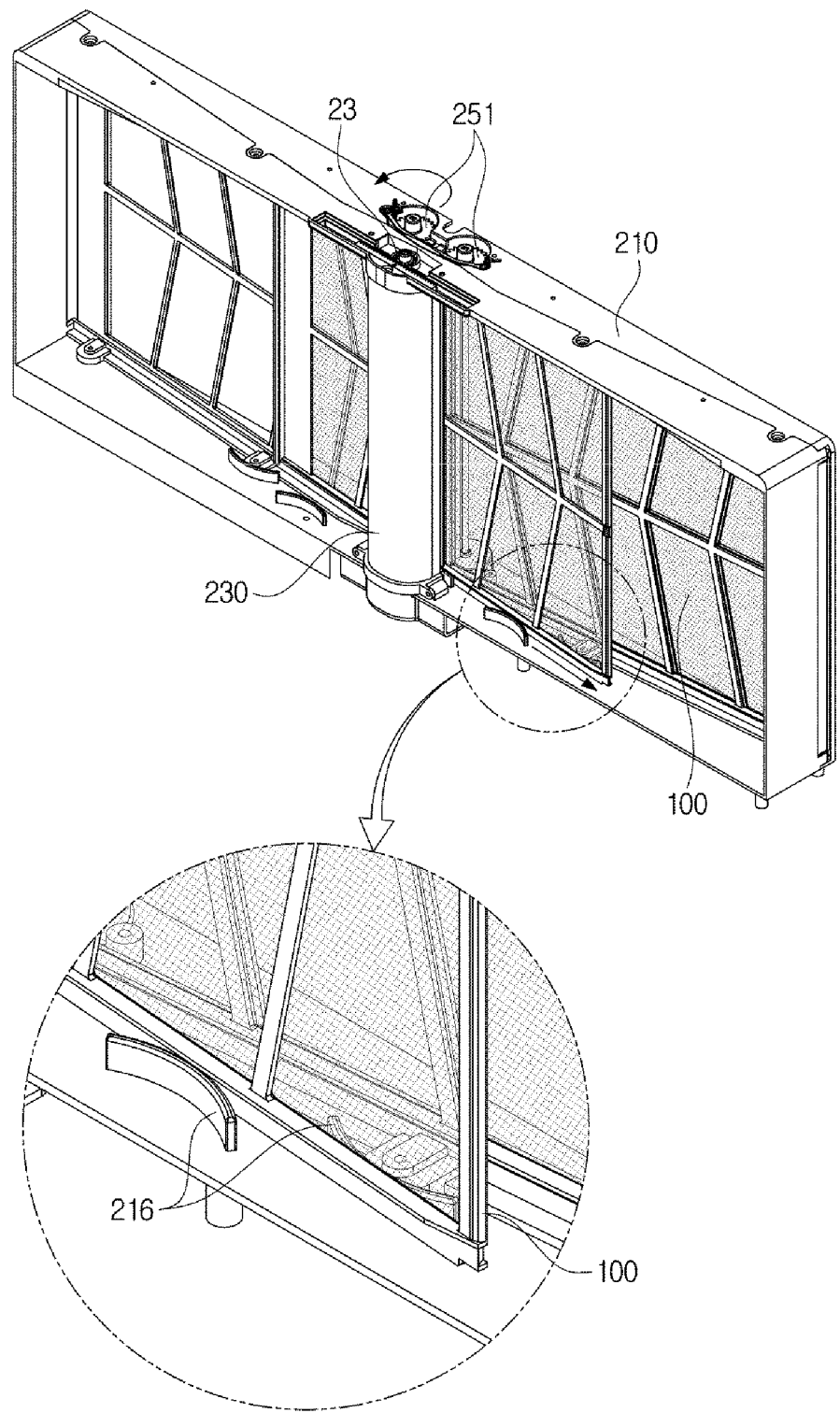
FIG. 7 illustrates a configuration of a part of a filter and a filter cleaning device of an air conditioner when the filter is moved partly according to various embodiments of the present disclosure.
Figure 8:
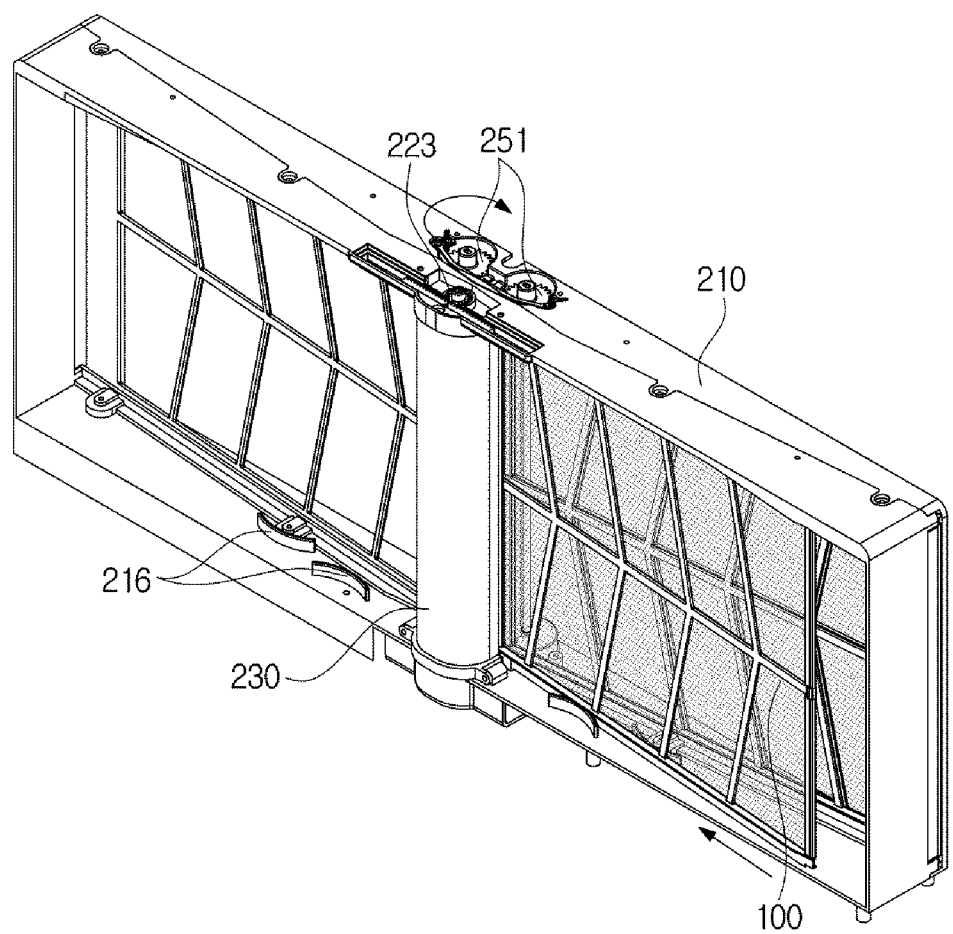
FIG. 8 illustrates a configuration of a part of a filter and a filter cleaning device of an air conditioner when the filter is moved to an one side of a frame according to various embodiments of the present disclosure.

As shown in FIG. 7, a guide portion 216 may be provided at the lower side of the inside surface of the frame 210 to guide the filter 100 which is moved.

The guide portion 216 may be provided in a protrusion shape extending from the lower side of the frame 210 to the upper side thereof and in an arc shape.

The guide portion 216 may be provided at both sides in pairs spaced apart from each other. The filter 100 may be moved toward a space between a pair of the guide portions 216 to be moved forward and backward.

The reason why the guide portion 216 is not formed as a recessed groove is to prevent a restriction of a movement of the filter 100 due to dust dropping from the filter 100 while the filter 100 is moved to be accumulated in the recessed groove.

Hereinafter, after the first dust elimination member 220 has eliminated dust from the filter 100, a process of eliminating dust by a second dust elimination member 240 will be described.

The first dust elimination member 220 is located at a middle portion of the frame 210, and particularly, is located within a movement section of the filter 100 to come in contact with the filter 100 while the filter 100 is moving.

At this point, the first dust elimination member 220 may eliminate dust from the filter 100 by coming in contact therewith while the filter 100 is moving.

The first dust elimination member 220 may include a contact portion 221 which comes in contact with the filter 100, and a rotation portion 222 for rotating the first dust elimination member 220.

The contact portion 221 may eliminate dust from the filter 100 through physical contact. Preferably, the contact portion 221 may be provided in a brush shape, and, if necessary, may be provided in a protrusion shape made of a material including a rubber capable of being bendable and the like.

The rotation portion 222 may be connected to the rack and pinion portion 223 to be bi-directionally rotated in engagement with a gear. The rack and pinion portion 223 may rotate the rotation portion 222 by receiving a rotational force from the first drive motor 224.

The dust elimination cover 230 may be provided to be spaced apart from an outer circumferential surface of the first dust elimination member 220. The dust elimination cover 230 may serve to primarily collect dust so as to prevent the filter 100 from being re-contaminated by a scattering of the dust collected at the first dust elimination member 220.

Figure 9:
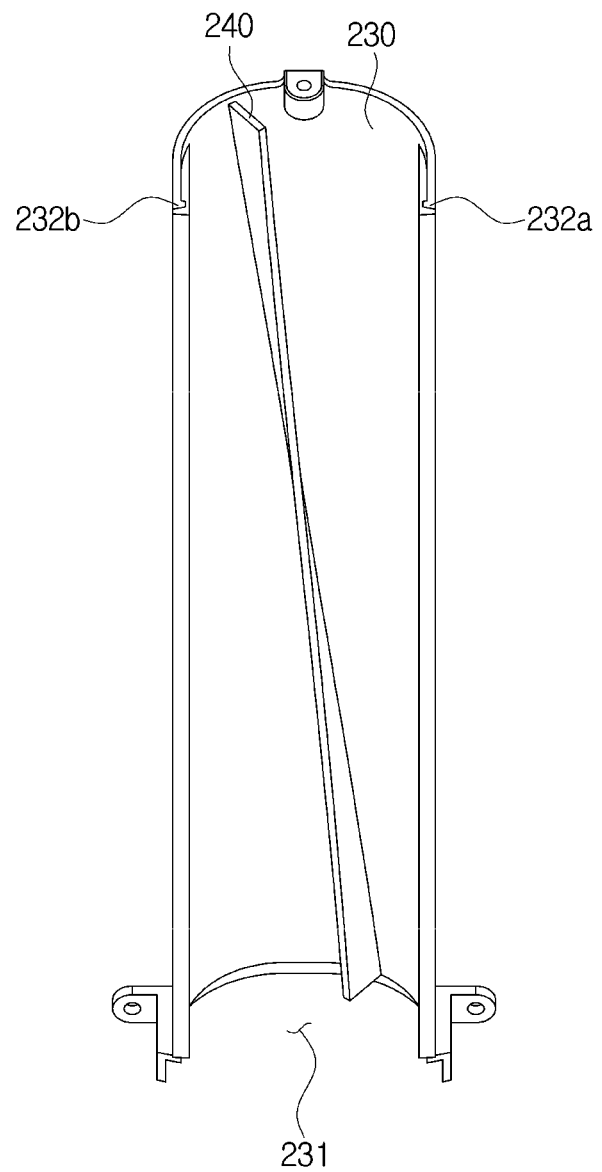
FIG. 9 illustrates a dust elimination cover of an air conditioner according to various embodiments of the present disclosure.

As shown in FIG. 9, the dust elimination cover 230 may be provided in an arc shape corresponding to the outer circumferential surface of the first dust elimination member 220. The second dust elimination member 240 in a rib shape may be diagonally provided at an inner circumferential surface of the dust elimination cover 230 in length direction thereof.

The second dust elimination member 240 may come in contact with the contact portion 221 being rotated to eliminate the dust collected at the contact portion 221.

The reason for that is the filter 100 may be re-contaminated by the dust existing at the contact portion 221 when the filter 100 comes in contact with the other filter 100 being alternately moved while the dust still resides on the contact portion 221.

The contact portion 221 may eliminate the dust by sequentially coming in contact with the second dust elimination member 240 from a side adjacent thereto provided in a diagonal direction along a rotational direction.

Figure 10A:
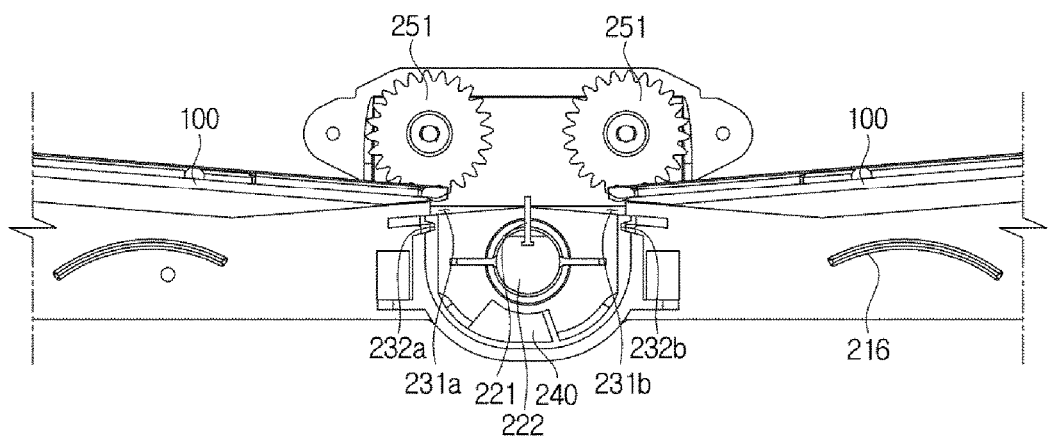
FIG. 10a illustrates a configuration of a part of a filter and a filter cleaning device of an air conditioner according to various embodiments of the present disclosure.

As shown in FIG. 10A, the dust elimination cover 230 may include an opening 231 spaced apart from the dust elimination cover 230 by a predetermined distance.

In particular, the dust elimination cover 230 may include a first protrusion 232a and a second protrusion 232b, which are provided at both ends thereof, and the first and second protrusions 232a and 232b may be provided to be spaced apart from the filter 100 seated at the frame 210.

A space between the first and second protrusions 232a and 232b and the filter 100 may be the opening 231, and the filter 100 may be moved through the opening 231.

Figure 10B:
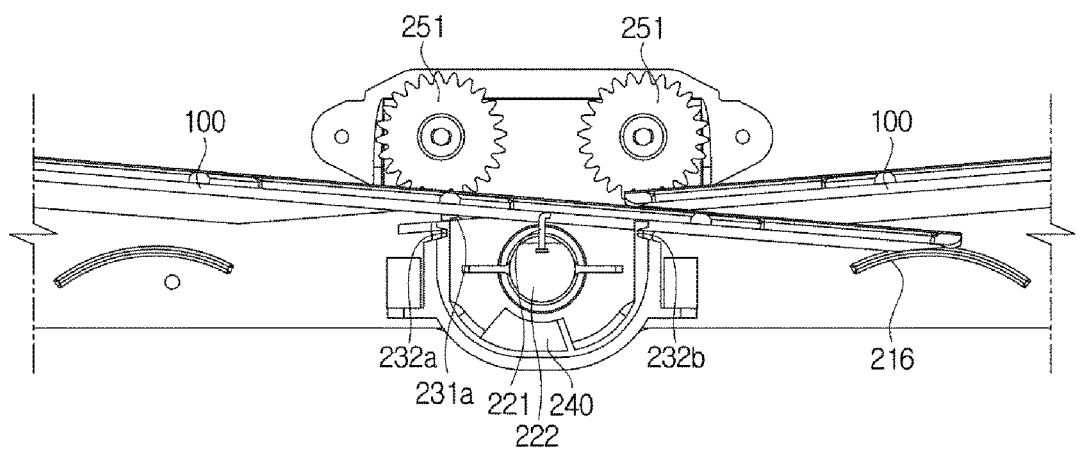
FIG. 10b illustrates a configuration of a part of a filter and a filter cleaning device of an air conditioner when the filter is moved partly according to various embodiments of the present disclosure.

As shown in FIG. 10B, when the filter 100 located at the left side is advanced in the diagonal direction, an opening 231b formed by the second protrusion 232b may be closed by the movement of the filter 100.

The filter 100 may come in contact with one side of the second protrusion 232b while moving. Therefore, the side of the second protrusion 232b coming in contact with the filter 100 may be provided to correspond to the diagonal direction thereof.

Figure 10C:
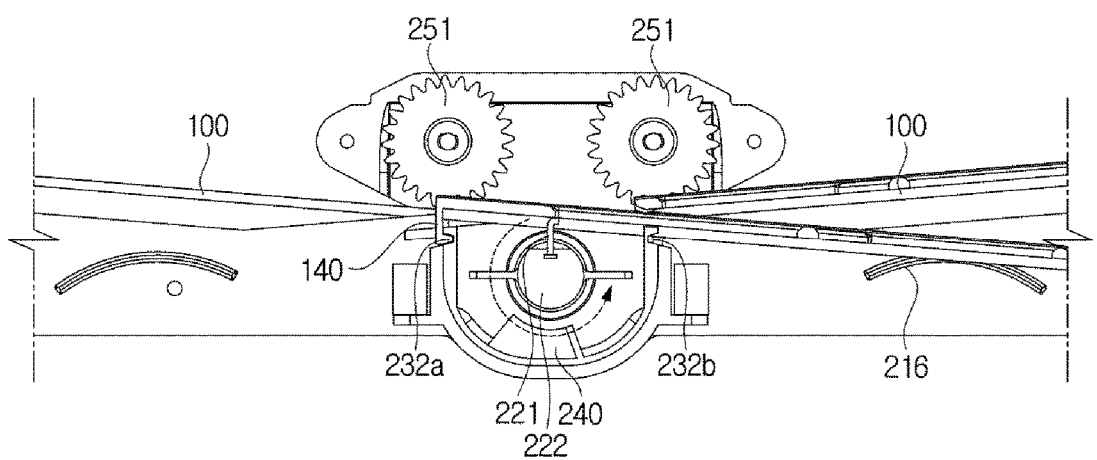
FIG. 10c illustrates a configuration of a part of a filter and a filter cleaning device of an air conditioner when the filter is moved to an one side of a frame according to one embodiment of the present disclosure.

An opening 231a provided by the first protrusion 232a is not closed in spite of the movement of the filter 100. As shown in FIG. 10C, however, the opening 231a may be closed when the protrusion 140 (See FIG. 12) provided at the one end of the filter 100 comes in contact with a concave-convex portion of the first protrusion 232a.

As shown in FIG. 10C, when the opening 231 of the dust elimination cover 230 is closed, the first dust elimination member 220 may be reversely rotated with respect to a movement direction of the filter 100, and thus may come in contact with the second dust elimination member 240 to eliminate dust.

The reason for the first dust elimination member 220 being rotated while the dust elimination cover 230 is closed is that a recontamination of the filter 100 may occur by dust scattered to an outward side of the dust elimination cover 230 through the opening 231 when the opening 231 is opened and also the first dust elimination member 220 and the second dust elimination member 240 may come in contact with each other.

In addition, the first dust elimination member 220 is reversely rotated with respect to the movement direction of the filter 100 so that the dust of the first dust elimination member 220 may be eliminated therefrom under the condition that a spaced distance from the filter 100 is maximally secured.

The reason for that is the one side of the filter 100 closing the dust elimination cover 230 is prevented from being re-contaminated with the dust.

Figure 10D:
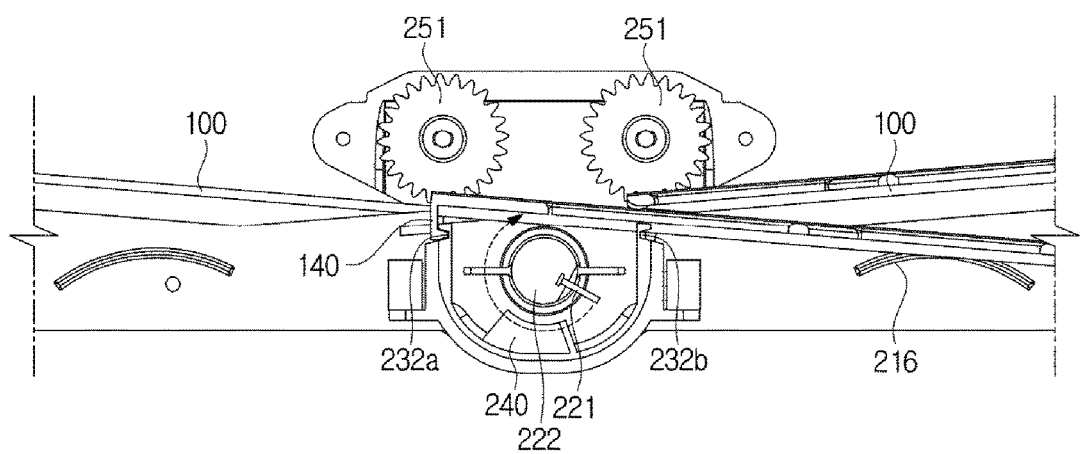
FIG. 10d illustrates a configuration of a part of a filter and a filter cleaning device of an air conditioner when a first dust elimination member is rotated after the filter is moved to an one side of a frame according to various embodiments of the present disclosure.

As shown in FIG. 10D, the first dust elimination member 220 may be rotated in a counterclockwise direction by approximately 270 degrees opposite the movement direction of the filter 100 located at the left side, and thereafter, may be reversely rotated by approximately 270 degrees to return to the original position.

At this point, the first dust elimination member 220 may be rotated two or more times so that the dust collected at the first dust elimination member 220 may be eliminated.

After the filter 100 is moved backward to return to the original position, the first dust elimination member 220 rotated by 270 degrees may be reversely rotated to return to the original position. Alternatively, as shown in FIG. 10D, prior to a backward movement of the filter 100 which is located at the other side, the first dust elimination member 220 may be reversely rotated by 270 degrees, and then the filter 100 may be moved backward.

Figure 10E:
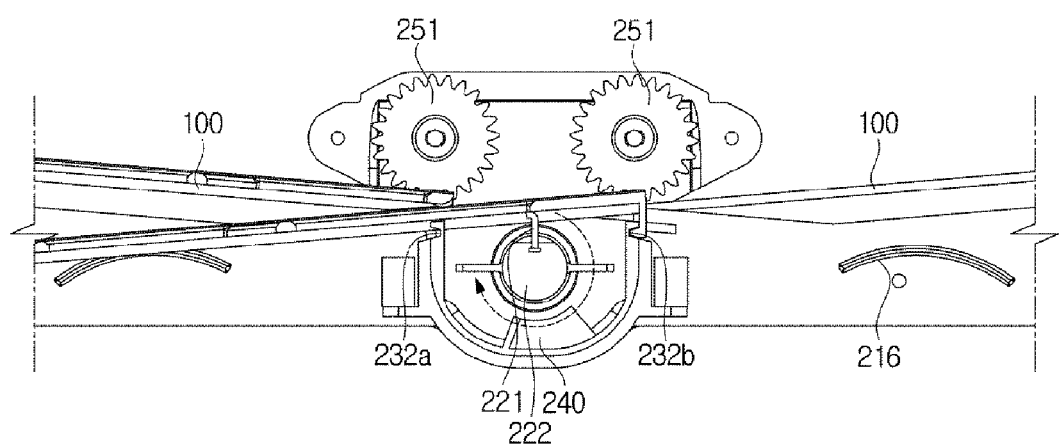
FIG. 10e illustrates a configuration of a part of a filter and a filter cleaning device of an air conditioner when the filter is moved to other side of a frame according to various embodiments of the present disclosure.
Figure 10F:
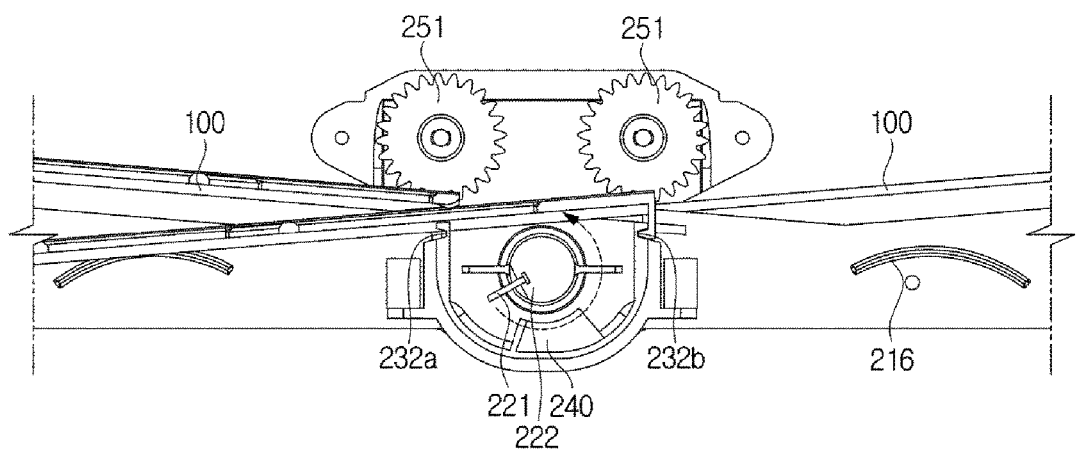
FIG. 10f illustrates a configuration of a part of a filter and a filter cleaning device of an air conditioner when a first dust elimination member is rotated after the filter is moved to other side of a frame according to various embodiments of the present disclosure.

As shown in FIGS. 10E and 10F, the filter 100 located at the right side may be moved under the condition that the openings 231a and 231b are opened and closed, respectively, by the first and second protrusions 232a and 232b contrary to the above description.

In addition, when the dust elimination cover 230 is completely closed by the protrusion 140, the first dust elimination member 220 may be rotated in a clockwise direction to come in contact with the second dust elimination member 240.

Figure 11A:
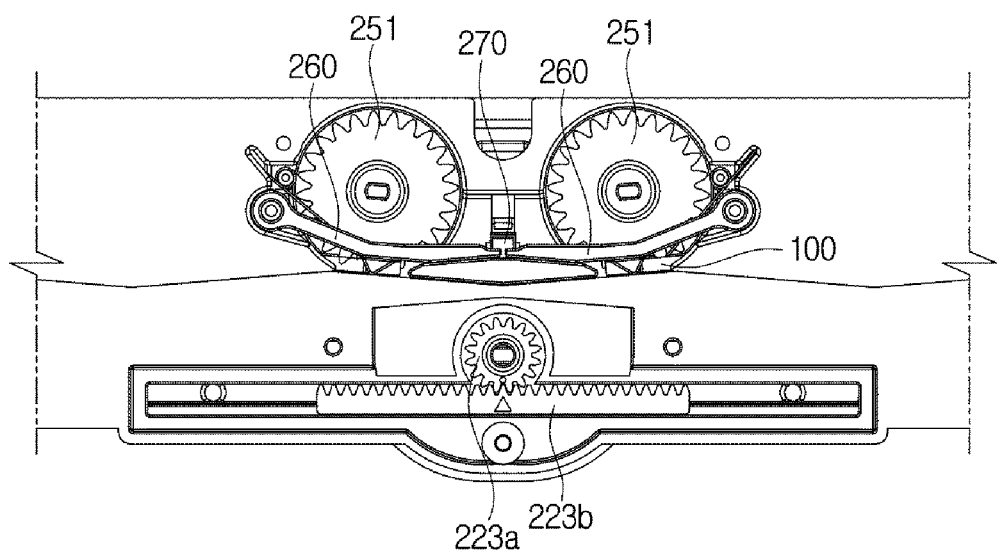
FIG. 11a illustrates a configuration of a part of a filter and a filter cleaning device of an air conditioner according to various embodiments of the present disclosure.
Figure 11B:
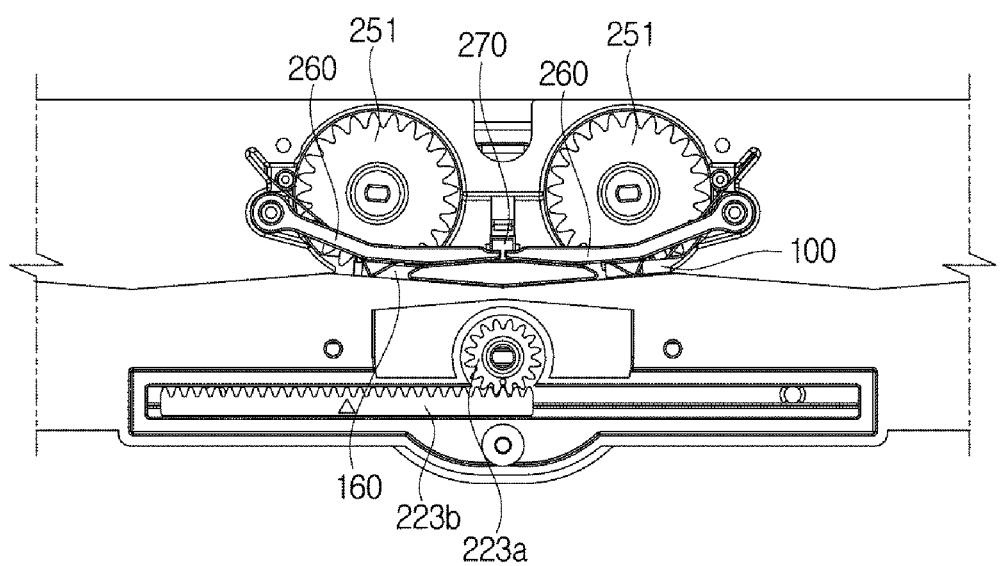
FIG. 11b illustrates a configuration of a part of a filter and a filter cleaning device of an air conditioner when a first dust elimination member is rotated to one direction according to various embodiments of the present disclosure.
Figure 11C:
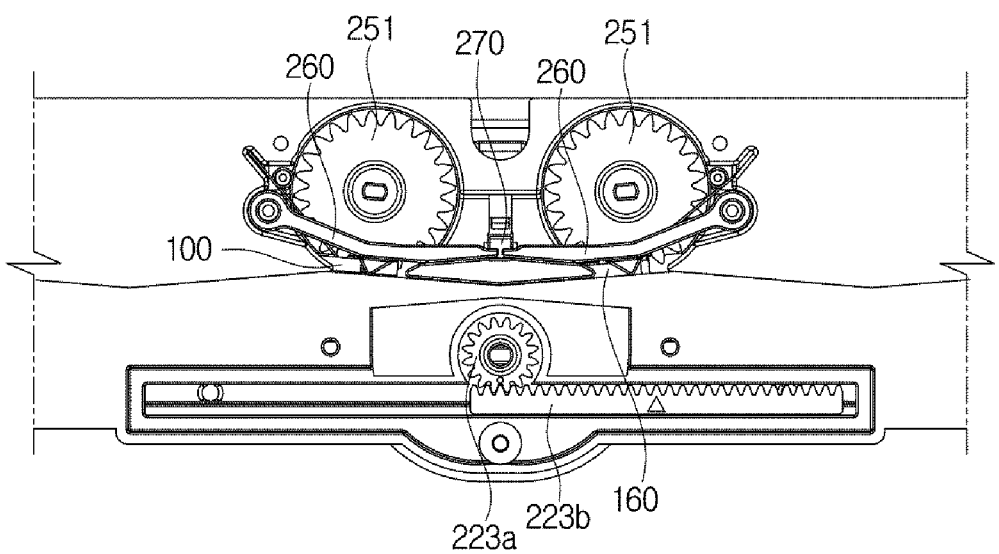
FIG. 11c illustrates a configuration of a part of a filter and a filter cleaning device of an air conditioner when a first dust elimination member is rotated to other direction according to various embodiments of the present disclosure.

As shown in FIGS. 11A to 11C, the first dust elimination member 220 may be rotated by the rack and pinion portion 223. The reason for that is the contact portion 221 may be rotated in one direction through the rack and pinion portion 223 and then may accurately return to the original position.

In particular, as shown in FIG. 11A, when the contact portion 221 is located at the original position, a rack gear 223a may be located at a center of the pinion 223b. Afterward, as shown in FIGS. 11B and 11C, the pinion 223b may be moved in left and right directions according to a rotation of the first drive motor 224.

A rotation of the rack gear 223a may be stopped when the rack gear 223a arrives at a left end or a right end of the pinion 223b, and the rack gear 223a may be rotated by 270 degrees while the pinion 223b is moved from the center position thereof toward the left end or the right end.

When the rack gear 223a arrives at the left end or the right end of the pinion 223b, the first drive motor 224 may generate a rotational force in a reverse direction to move the rack gear 223a back to the center position of the pinion 223b and place it there.

The rack gear 223a may be reversely rotated by exactly as much as the previous amount of rotation thereof so as to place the pinion 223b at the center so that the first dust elimination member 220 connected to the rack gear 223a may return to the original position.

In the case that the first dust elimination member 220 is directly coupled to the first drive motor 224, measuring a precise amount of rotation may be difficult so that the first dust elimination member 220 may not return to the original position when the first drive motor 224 rotates in the reserve direction. On the other hand, in accordance with the present disclosure, the first drive motor 224 may rotate only as much as a movement distance of the pinion 223b so that the first dust elimination member 220 may accurately return to the original position after being rotated.

While the filter 100 is being moved and cleaned, a message of 'Cleaning . . . ' may be displayed on a display (not shown) of a body of the air conditioner 1. For this purpose, the filter cleaning device 200 may include the pivot member 260 and the switch member 270 for detecting a movement of the filter 100.

Figure 12:
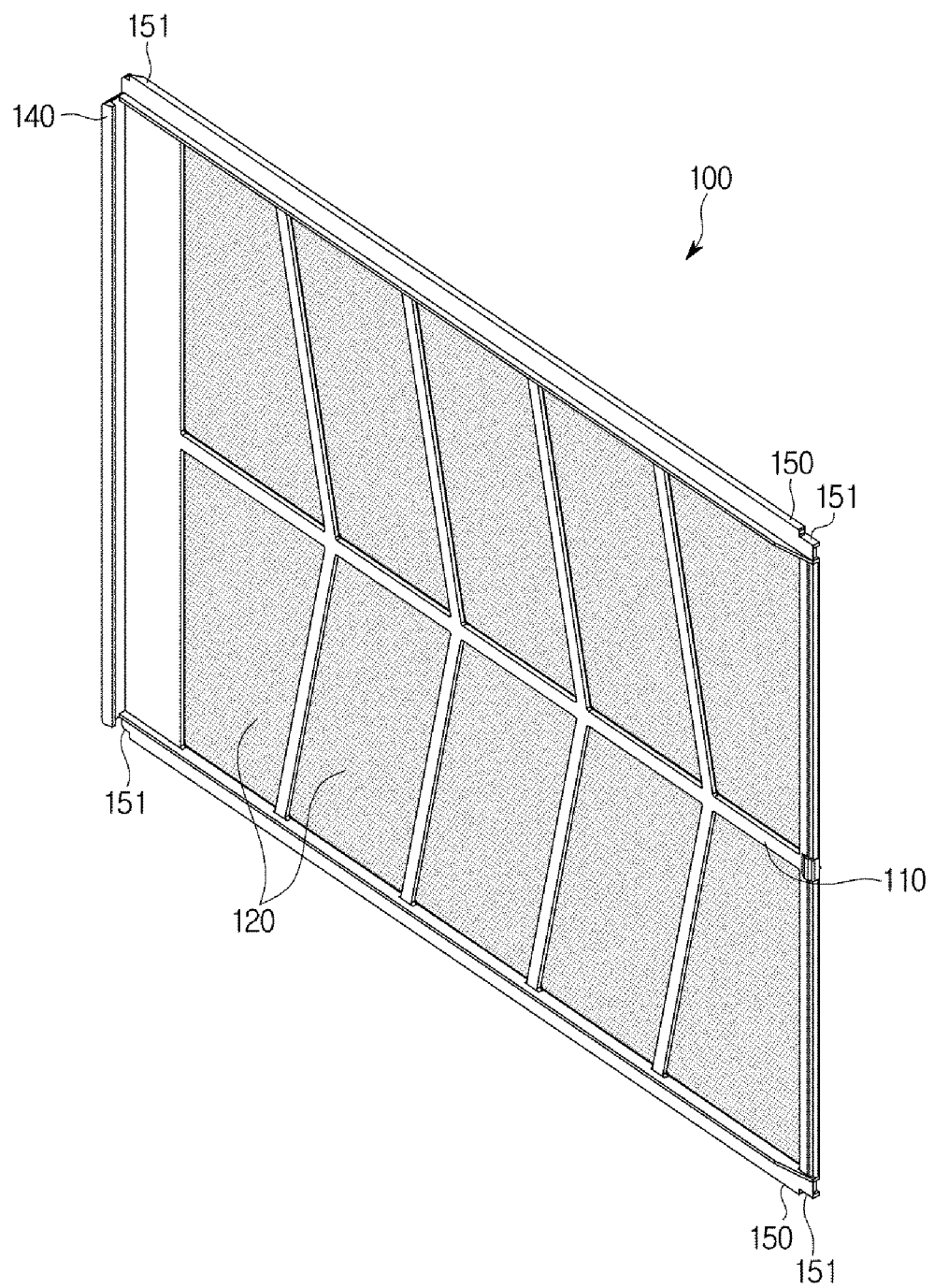
FIG. 12 illustrates a filter of an air conditioner according to various embodiments of the present disclosure.
Figure 13A:
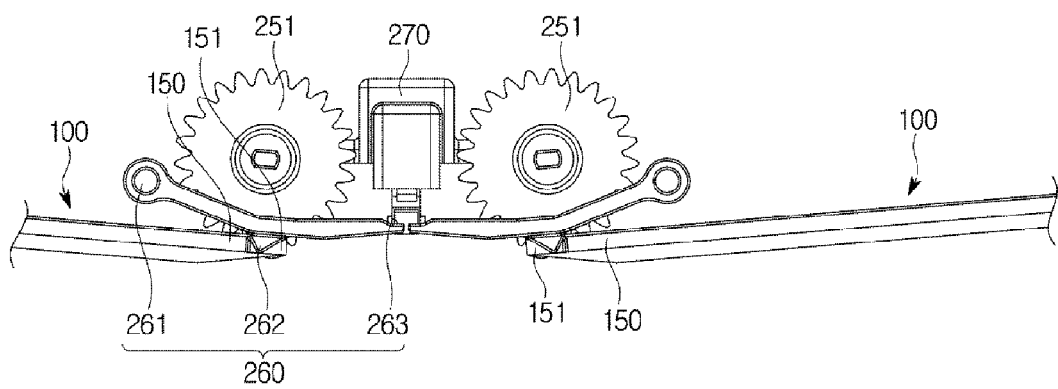
FIG. 13a illustrates a configuration of a part of a filter and a filter cleaning device of an air conditioner according to various embodiments of the present disclosure.
Figure 14A:
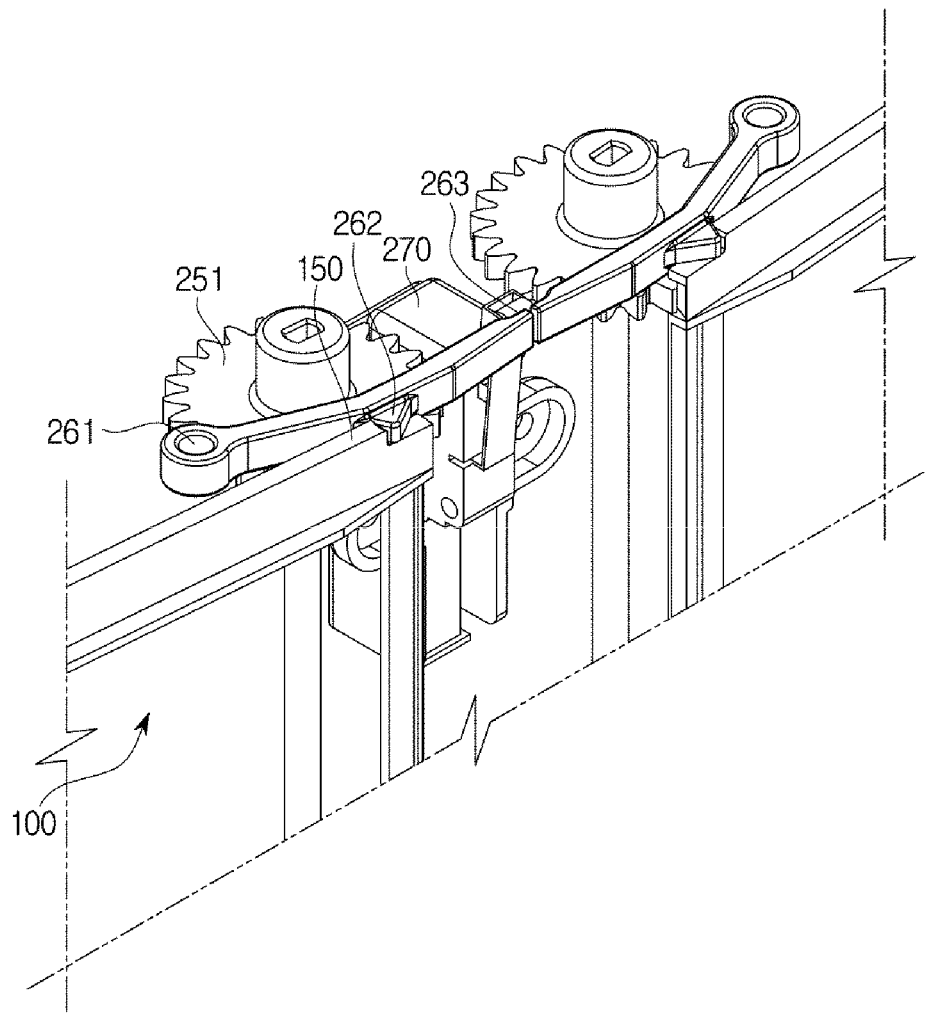
FIG. 14a illustrates a configuration of a part of a filter and a filter cleaning device of an air conditioner according to various embodiments of the present disclosure.

As shown in FIGS. 12, 13A, and 14A, the pivot member 260 is provided at an upper side of the driving gear 251. The pivot member 260 may be rotated around a pivot shaft 261 to pressurize the switch member 270 provided in a lateral direction of the driving gears 251.

The pivot member 260 may include a delivery portion 262 pressurized by one side of the filter 100 while being moved to deliver a rotational force to the pivot member 260, and an operating portion 263 for pressurizing and operating the switch member 270 when the pivot member 260 is rotated.

Additionally, the pivot member 260 may be provided to include an elastic member (not shown) delivering an elastic force to the filter 100, thereby pressurizing the pivot member 260 thereto.

A spacing portion 151 having a size corresponding to the delivery portion 262 may be provided at either corner portion of each of the upper and lower sides of the filter 100, and a pressurizing portion 150 protruding in vertical direction may be provided at the upper and lower sides of the filter 100 except for where the spacing portion 151 is provided.

Prior to a movement of the filter 100, the delivery portion 262 may be located at the spacing portion 151 provided at one side of the filter 100. When moved, the filter 100 proceeds in a diagonal direction so that one side of the pressurizing portion 150 pressurizes the delivery portion 262.

One side of the delivery portion 262 coming in contact with the pressurizing portion 150 may include a curved surface shape or an inclined surface shape without interfering with the movement of the filter 100. Upon being pressurized, the pivot member 260 may be rotated to a rear side without interfering with the pressurizing portion 150 by means of the curved surface shape or the inclined surface shape.

Figure 13B:
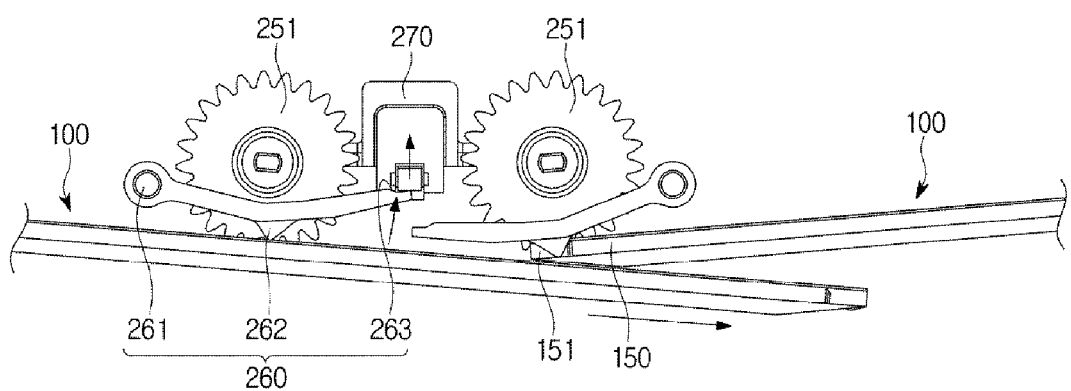
FIG. 13b illustrates a configuration of a part of a filter and a filter cleaning device of an air conditioner when the filter is moved partly according to various embodiments of the present disclosure.
Figure 14B:
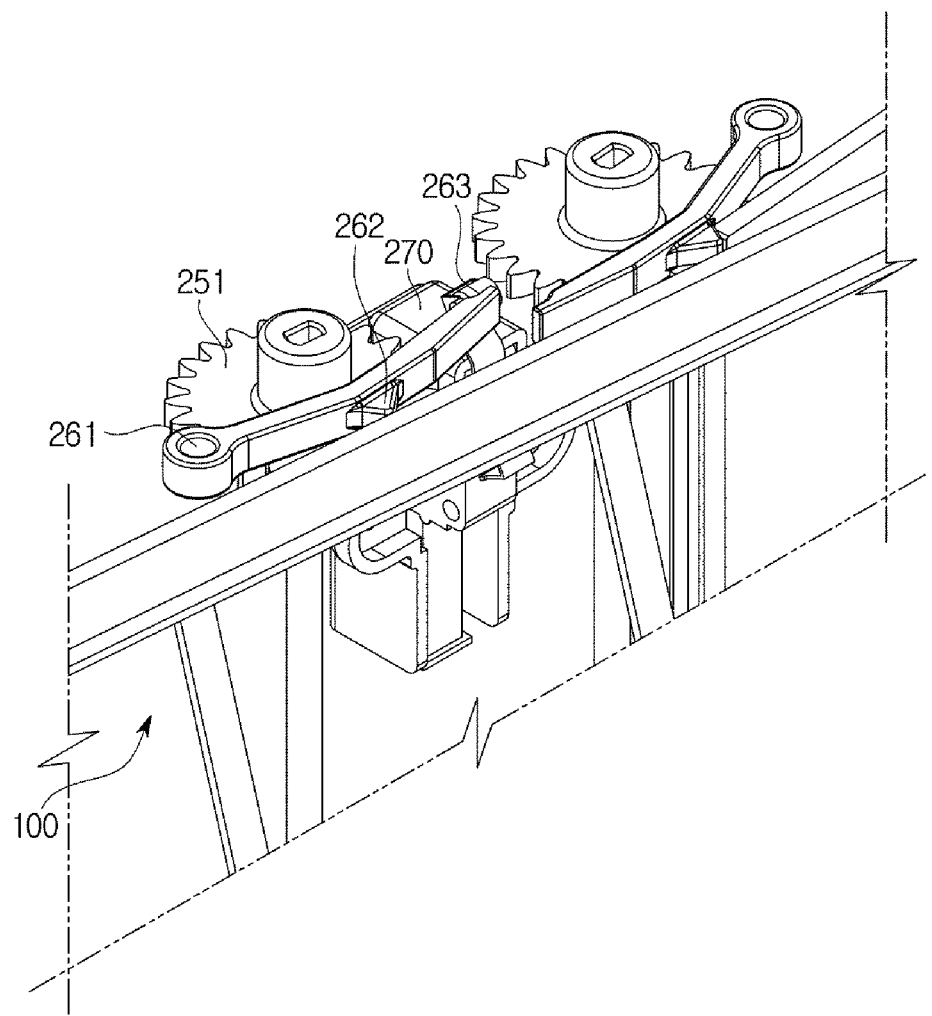
FIG. 14b illustrates a configuration of a part of a filter and a filter cleaning device of an air conditioner when the filter is moved partly according to various embodiments of the present disclosure.

As shown in FIGS. 13B and 14B, when the filter 100 is moved, the pressurizing portion 150 may pressurize a rear side of the delivery portion 262 so that the pivot member 260 may be rotated to the rear side around the pivot shaft 261.

The operating portion 263 provided at one end of the pivot member 260 may be moved to the rear side by a rotating of the pivot member 260 to pressurize the switch member 270, thereby turning on the switch member 270.

Figure 13C:
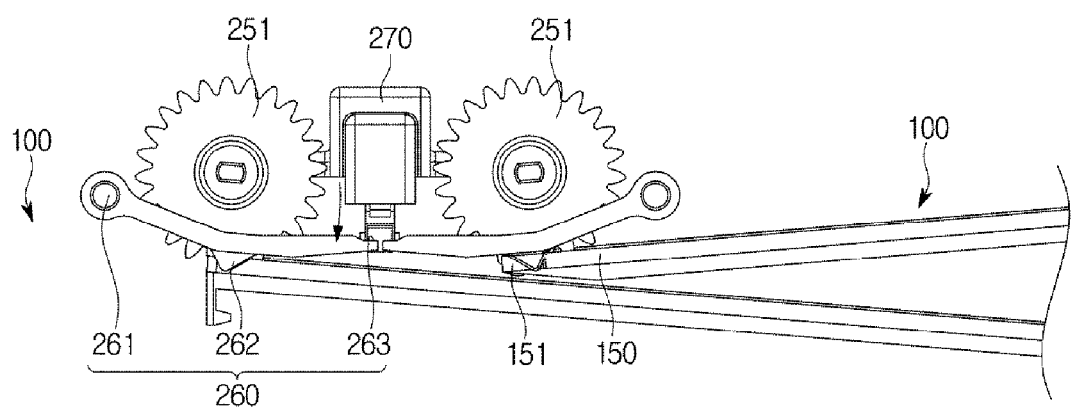
FIG. 13c illustrates a configuration of a part of a filter and a filter cleaning device of an air conditioner when the filter is moved to an one side of a frame according to various embodiments of the present disclosure.
Figure 14C:
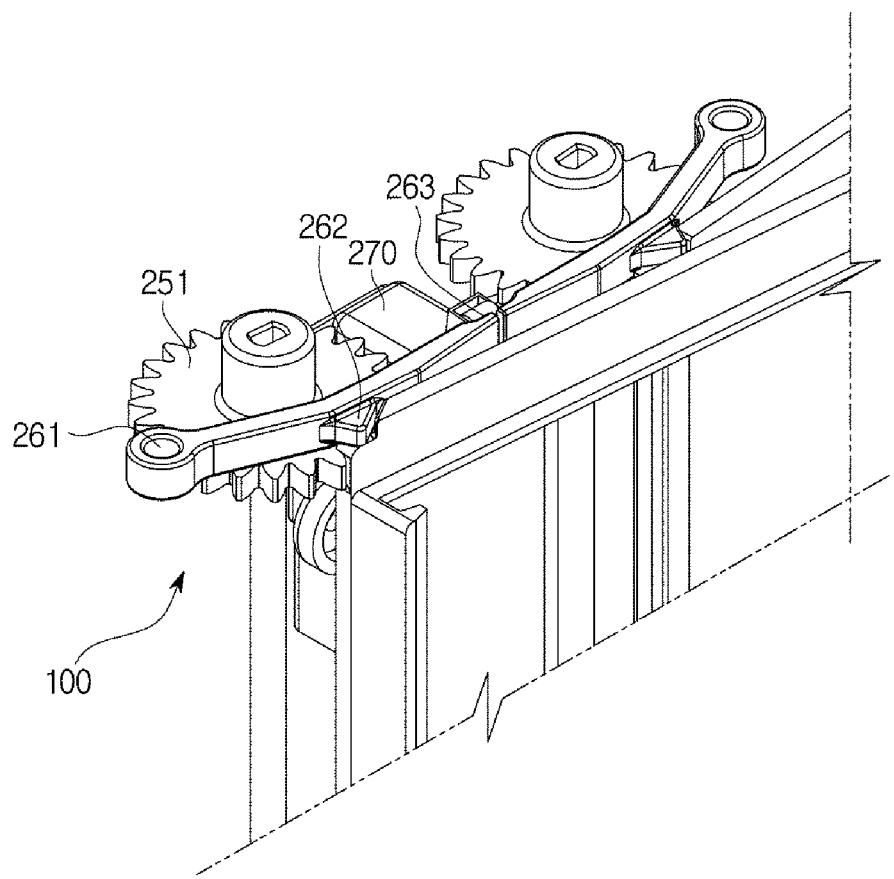
FIG. 14c illustrates a configuration of a part of a filter and a filter cleaning device of an air conditioner when the filter is moved to an one side of a frame according to various embodiments of the present disclosure.

As shown in FIGS. 13C and 14C, when the filter 100 has been moved to the other side of the frame 210 and the forward movement is completed, a front side of the delivery portion 262 may be pressurized by the elastic member (not shown) provided at the pivot member 260 to be located at the spacing portion 151 provided at the other side of the filter 100.

According to the delivery portion 262 being located at the spacing portion 151, the pivot member 260 may be rotated to the front side and thus the operating portion 263 may also be moved to the front side to be spaced from the switch member 270 so that the switch member 270 may be turned off.

Afterward, when the backward movement of the filter 100 proceeds, referring back to FIGS. 13B and 14B, the pressurizing portion 150 may pressurize the delivery portion 262 and the operating portion 263 may come in contact with the switch member 270 so that the switch member 270 may be turned on again.

Hereinafter, another embodiment of the present disclosure will be described. In another embodiment of the present disclosure, a description of a configuration of a filter cleaning device 200 disposed at a unitary air conditioner 1' the same as that of the filter cleaning device 200 of the air conditioner 1 will be omitted.

The unitary air conditioner 1' may perform not only a cooling and heating function of an indoor space like the air conditioner 1 but also a ventilation function.

The ventilation function may be performed by introducing outside air and directly providing the outside air to the indoor space. Alternatively, when a temperature difference between the indoor space and an outdoor space occurs, the ventilation function may be performed by introducing air having a constant temperature through a heat exchange between air ventilated from the indoor space to the outdoor space and air provided from the outdoor space to the indoor space.

Therefore, the unitary air conditioner 1' may maintain the indoor space in a comfortable state through typical ventilation and total heat exchange ventilation, and also may realize energy savings by using heat of air being ventilated to the outdoor space without needing a separate configuration for heat exchanging with air provided in the indoor space.

Figure 15:
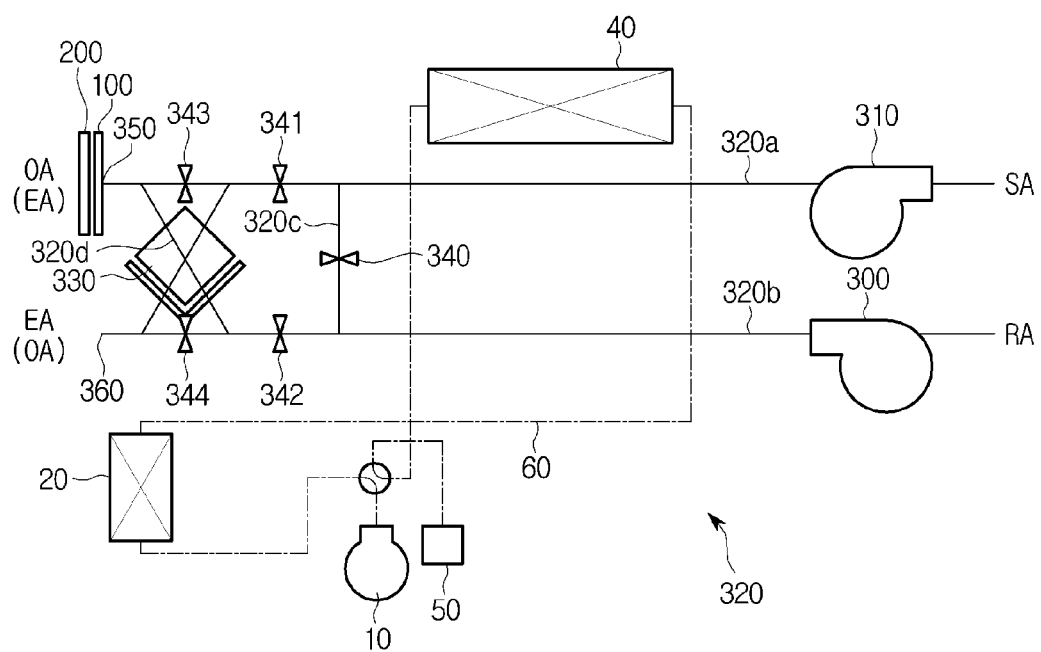
FIG. 15 illustrates a unitary air conditioner according to various embodiments of the present disclosure.
Figure 16:
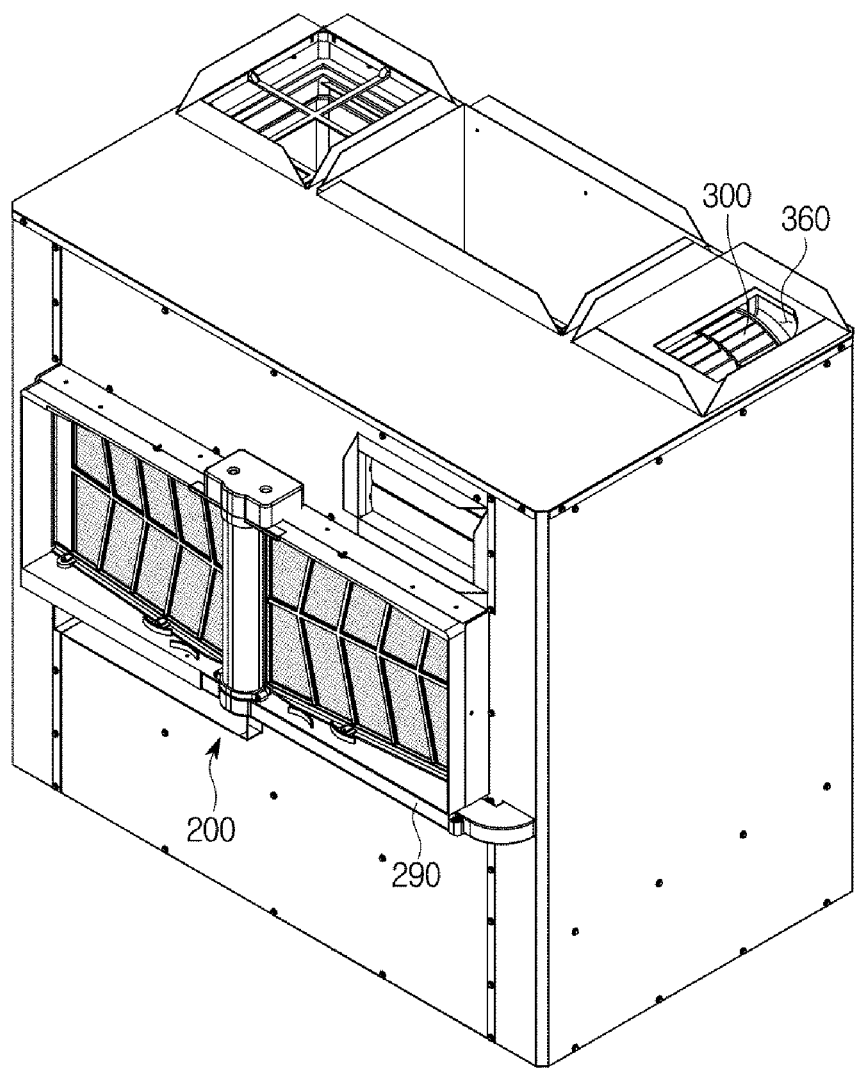
FIG. 16 illustrates a unitary air conditioner according to various embodiments of the present disclosure.

As shown in FIGS. 15 and 16, the unitary air conditioner 1' may include a cooling cycle of the air conditioner 1. The compressor 10, the accumulator 50, and the condenser 20 may be provided in the outdoor unit, and the evaporator 40 for exchanging heat with air passing through the indoor unit may be provided therein.

The unitary air conditioner 1' may include an air passage 320 separately from the refrigerant pipe 60 through which a refrigerant is delivered.

One side of the air passage 320 may be provided toward an outdoor side, and may include an outdoor suction inlet 350 for suctioning an outside air OA and an outdoor exhaust outlet 360 for discharging an exhaust air EA from an indoor space to an outdoor space.

The other side of the air passage 320 may include an air supply fan 310 for supplying a supply air SA into the indoor space and a ventilation fan 300 for discharging a return air RA circulating in the indoor space to the outdoor space.

A first air passage 320a is formed between the outdoor suction inlet 350 and the air supply fan 310, and a second air passage 320b is formed between the outdoor exhaust outlet 360 and the ventilation fan 300. In addition, a third air passage 320c may be provided to connect the first air passage 320a to the second air passage 320b.

A total enthalpy heat exchanger 330 may be provided at a portion adjacent to outdoor openings of the first and second air passages 320a and 320b, and fourth air passages 320d passing through the total enthalpy heat exchanger 330 from the first and second air passages 320a and 320b and intersecting with each other may be provided.

The evaporator 40 may be provided at one side of the first air passage 320a.

Therefore, the outside air is heat exchanged and suctioned into the indoor space, and thus a cooling function or a heating function (in this case, the evaporator 40 serves as the condenser 20) may be performed.

A bypass damper 340 may be provided at the third air passage 320c. When the bypass damper 340 is opened, air in the first and second air passages 320a and 320b may circulate.

A first damper 341 may be provided between the first air passage 320a and the fourth air passages 320d, and a third damper 343 may be provided at a section formed between the fourth air passages 320d on the first air passage 320a.

In a similar way as such a configuration, a second damper 342 may be provided between the second air passage 320b and the fourth air passages 320d, and a fourth damper 344 may be provided at a section formed between the fourth air passages 320d on the second air passage 320b.

The outdoor suction inlet 350 may suction the outside air therein and thus the filter 100 for eliminating dust contained in the outside air may be provided at the outdoor suction inlet 350. In addition, the filter cleaning device 200 may be provided at one side of the filter 100.

Hereinafter, configurations of the unitary air conditioner 1' according to operation modes will be described.

In a 'cooling and heating mode', the unitary air conditioner 1' may perform a cooling and heating function through air being heat exchanged with the evaporator 40 by circulating the return air RA in an indoor space.

At this point, as for the air passage 320, the first damper 341 and the second damper 342 are closed and the bypass damper 340 is opened.

As a result, the return air RA may be suctioned into the second air passage 320b through the ventilation fan 300, heat exchanged with the evaporator 40 through the third air passage 320c and the first air passage 320a, and then suctioned into the indoor space through the air supply fan 310.

In a 'ventilation mode', the unitary air conditioner 1' may suction the outside air OA therein to supply the outside air OA into the indoor space and may directly exhaust the return air RA inside the indoor space to the outdoor space, thereby circulating air in the indoor space.

At this point, as for the air passage 320, the bypass damper 340 is closed. Therefore, the outside air OA may be suctioned into the indoor space by passing through the air supply fan 310 through the first air passage 320a, and the return air RA may be directly discharged into the outdoor exhaust outlet 360 along the second air passage 320b through the ventilation fan 300.

In a 'total heat exchange mode', the unitary air conditioner 1' may suction the outside air OA and move the outside air OA and the return air RA, which is discharged prior to an inflow of the outside air OA into the indoor space, to the total enthalpy heat exchanger 330, thereby enabling the outside air OA and the return air RA to be heat exchanged with each other.

At this point, as for the air passage 320, the third damper 343 and the fourth damper 344 are closed such that the air supply fan 310 and the ventilation fan 300 may intersect with and be connected to the outdoor exhaust outlet 360 and the outdoor suction inlet 350, respectively.

Therefore, the return air RA moved to the second air passage 320b by the ventilation fan 300 may pass the total enthalpy heat exchanger 330 along the fourth air passage 320d, and the outside air OA suctioned by the air supply fan 310 through the outdoor exhaust outlet 360 may pass the total enthalpy heat exchanger 330 along the fourth air passage 320d so that the return air RA and the outside air OA may be heat exchanged with each other.

The heat-exchanged outside air OA may be suctioned into the indoor space by the air supply fan 310 along the first air passage 320a by passing the fourth air passage 320d, and the heat-exchanged return air RA may be exhausted to the outdoor space through the outdoor suction inlet 350 along the fourth air passage 320d through the first air passage 320a.

In the 'total heat exchange mode' as described above, the return air RA may be exhausted through the outdoor suction inlet 350, and the outside air OA may be suctioned into the indoor space through the outdoor exhaust outlet 360. That is, a configuration of the outdoor suction inlet 350 and the outdoor exhaust outlet 360 in a typical 'ventilation mode' may be converted.

The total enthalpy heat exchanger 330 may provide a space in which the outside air OA and the return air RA are heat exchanged with each other by having a passage of the outside air OA and a passage of the return air RA, which are come into contact with each other.

Since the outside air OA flowing into the indoor space was heat exchanged with the return air RA, a temperature of the outside air OA may be maintained similar to that of the return air RA which existed in the indoor space. Consequently, a user may feel comfortable.

In the 'total heat exchange mode', since the outside air OA is introduced into the indoor space through the outdoor exhaust outlet 360 not provided with the filter 100, an additional filter 100 and a filter cleaning device 200 corresponding thereto may be provided at the first air passage 320a.

Preferably, the additional filter 100 and the filter cleaning device 200 may be provided at a section of the first air passage 320a behind a connection point of the fourth air passage 320d and the first air passage 320a. Additionally, like the filter cleaning device 200 provided at the outdoor suction inlet 350, the filter 100 may be provided at the outdoor exhaust outlet 360 and the filter cleaning device 200 corresponding to the filter 100 may be further provided.

Figure 17:
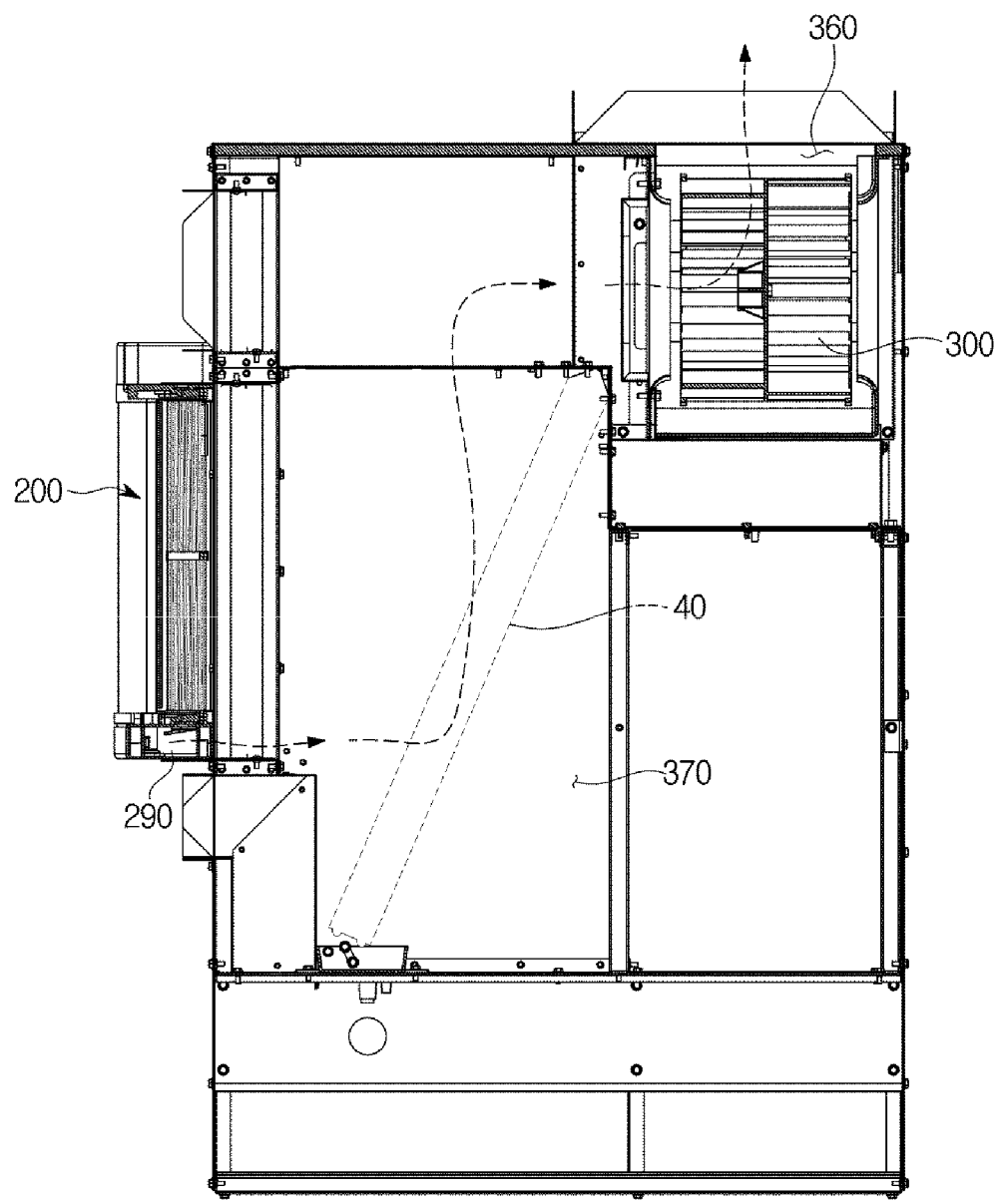
FIG. 17 illustrates a unitary air conditioner according to various embodiments of the present disclosure.

As shown in FIGS. 16 and 17, the discharge passage 290 may be provided at one side of the filter cleaning device 200. The discharge passage 290 may be connected to an inward side of the indoor unit of the unitary air conditioner 1' to be in communication with a movement space 370 which is opened to the ventilation fan 300.

The movement space 370 may be a space provided at the inward side of the indoor unit and with no configuration, and lateral surfaces of the movement space 370 except for an opening provided toward the ventilation fan 300 may be sealed.

When the ventilation fan 300 operates, air existing in the movement space 370 may be suctioned toward the ventilation fan 300 to be exhausted to the outside.

Dust collected at the filter cleaning device 200 may be moved to an inward side of the movement space 370 through the discharge passage 290 and stay for a predetermined time, and then may be discharged to the outside side with the air inside the movement space 370 when the ventilation fan 300 operates.

The lateral surfaces of the movement space 370 except the opening are sealed and the dust which has stayed in the movement space 370 is isolated from the evaporator 40 and the air passage 320, which are provided inside the indoor unit, so that contamination caused by the dust inside the indoor unit may be prevented.

The dust collected at the filter cleaning device 200 is moved to the movement space 370 through the discharge passage 290 by the ventilation fan 300 of the unitary air conditioner 1' operating in the 'ventilation mode' or the 'total heat exchange mode' to be discharged to the outside, so that the user does not need to eliminate the collected dust.

The filter cleaning device 200 may proceed with a cleaning of the filter 100 regardless of the operation modes of the unitary air conditioner 1'.

When a cleaning proceeds while the unitary air conditioner 1' is operated, the collected dust may be discharged immediately to the outside by the ventilation fan 300, and otherwise, the collected dust may temporarily stay in the discharge passage 290 or the movement space 370 when the ventilation fan 300 does not operate, and then may be discharged to the outdoor side immediately when the ventilation fan 300 operates.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An air conditioner comprising:
a suction inlet configured to suction air;
a filter movably arranged at one side of the suction inlet;
a first dust elimination member provided within a movement section of the filter to eliminate dust thereof by coming in contact with the filter when the filter is moved; and
a second dust elimination member provided adjacent to one side of the first dust elimination member to eliminate dust collected at the first dust elimination member,
wherein the first dust elimination member is reversely rotated with respect to a movement direction of the filter to come in contact with the second dust elimination member, thereby eliminating the dust collected at the first dust elimination member, and
wherein the filter includes a protrusion configured to protrude toward one side of the filter and the movement direction of the filter is changed when the protrusion and one side of a dust elimination cover come in contact with each other.

2. The air conditioner of claim 1, further comprising:
the dust elimination cover spaced apart from the first dust elimination member to cover one side of the first dust elimination member and including the one side which is opened,
wherein the second dust elimination member is provided at an inside surface of the dust elimination cover.

3. The air conditioner of claim 2, wherein the filter is reciprocally moved between a first position and a second position, and the dust elimination cover is sealed by coming in contact with one side of the filter when the filter arrives at the second position.

4. The air conditioner of claim 1, wherein the filter includes teeth corresponding to a length of one lateral side of the filter and provided in a length direction of the one lateral side thereof,
wherein the air conditioner further comprises:
a driving gear configured to engage with the teeth to deliver power to reciprocally move the filter.

5. The air conditioner of claim 2, wherein the protrusion is configured to protrude toward the one side of the filter to allow the filter, which has moved, to come in contact with the one side of the dust elimination cover, thereby sealing the dust elimination cover.

6. The air conditioner of claim 1, wherein a pivot member pressurized by one side of the filter when the filter is moved to perform a rotational movement.

7. The air conditioner of claim 5, wherein, after the protrusion and the one side of the dust elimination cover come in contact with each other, the first dust elimination member is reversely rotated with respect to the movement direction of the filter to come in contact with the second dust elimination member.

8. The air conditioner of claim 6, further comprising:
a switch member pressurized by one side of the pivot member being rotationally moved to be operated only when the filter is moved.

9. The air conditioner of claim 8, wherein the pivot member includes:
a pivot shaft;
a delivery portion pressurized by the one side of the filter to deliver a rotational force to the pivot member; and
an operating portion configured to pressurize and operate the switch member when the pivot member is rotated,
wherein the filter includes a pressurizing portion configured to protrude toward the filter from a position corresponding to the operating portion to pressurize the operating portion when the filter is reciprocally moved.

10. The air conditioner of claim 1, further comprising:
a filter cleaning device comprising a discharge outlet configured to discharge dust collected by the second dust elimination member to an outside of the filter cleaning device.

11. The air conditioner of claim 1, wherein the second dust elimination member is provided to extend in a diagonal direction with respect to a rotational axis of the first dust elimination member, and, when rotated, the first dust elimination member sequentially comes in contact with one end of the second dust elimination member to an other end thereof to eliminate dust.

12. A unitary air conditioner comprising:
a suction inlet configured to suction outside air;
a filter arranged at the suction inlet;
a ventilation device configured to discharge air to an outside; and
a filter cleaning device configured to clean the filter by moving the filter,
wherein the filter cleaning device includes:
a first dust elimination member provided within a movement section of the filter to come in contact therewith when the filter is moved to eliminate dust of the filter; and
a second dust elimination member arranged adjacent to one side of the first dust elimination member to eliminate dust collected at the first dust elimination member,
wherein the first dust elimination member is moved in a direction spaced apart from the filter and comes in contact with the second dust elimination member to eliminate the dust collected at the first dust elimination member,
wherein the filter includes a protrusion configured to protrude toward one side of the filter and a movement direction of the filter is changed when the protrusion and one side of a dust elimination cover come in contact with each other, and
wherein the first dust elimination member includes a discharge passage configured to connect the ventilation device to the filter cleaning device so as to move dust collected by the second dust elimination member to the ventilation device, thereby discharging the dust to an outside of the filter cleaning device.

13. The unitary air conditioner of claim 12, wherein the ventilation device is configured to discharge the dust collected by the second dust elimination member with air in an indoor space through the discharge passage to the outside of the unitary air conditioner when operated in an indoor air discharge mode.

14. The unitary air conditioner of claim 12, further comprising:
a dust collector provided at one side of the discharge passage to collect the dust discharged from the filter cleaning device.

15. The unitary air conditioner of claim 12, wherein the filter cleaning device further includes the dust elimination cover spaced apart from the first dust elimination member to cover the one side thereof,
wherein the first dust elimination member is provided to be rotatable, the second dust elimination member is arranged at an inner circumferential surface of the dust elimination cover in a diagonal direction with respect to a length direction of the dust elimination cover, and the second dust elimination member comes in contact with the first dust elimination member being reversely rotated with respect to the movement direction of the filter to eliminate the dust collected at the first dust elimination member.

16. The unitary air conditioner of claim 15, wherein the filter cleaning device further includes a frame configured to form a section at which the filter is moved,
   wherein the filter is provided as two filters arranged toward a center of the filter from both ends of the frame, and the first dust elimination member is located between the two filters to alternately come in contact with the two filters being reciprocally moved.

17. The unitary air conditioner of claim 16, wherein the dust elimination cover is provided in a length direction corresponding to a height direction of the frame, and includes an opening formed by opening portions of both ends of the dust elimination cover and a side thereof toward the filter,
   wherein the opening is closed by the one side of the filter when a movement of the filter from one side of the frame to an other side thereof is completed, and the first dust elimination member is rotated after the opening is closed.

18. The unitary air conditioner of claim 12, wherein the filter further includes teeth provided in a reciprocal movement direction of the filter,
   wherein the filter cleaning device further includes a driving member configured to move the filter, and
   wherein the driving member includes:
      teeth;
      a driving gear provided to correspond to the teeth to engage therewith; and
      a motor configured to deliver a rotational force to the driving gear.

19. The unitary air conditioner of claim 16, wherein the filter cleaning device further includes:
   a pivot member pressurized by one side of the filter which is moved to perform a rotational movement around a rotation shaft provided at the frame; and
   a switch member pressurized by one side of the pivot member which is being rotationally moved to be operated only when the filter is moved,
   wherein the pivot member includes:
      a delivery portion pressurized by the one side of the filter to deliver a rotational force; and
      an operating portion configured to pressurize and operate the switch member when the pivot member is rotated, and
   wherein the filter includes a pressurizing portion protruding toward the filter from a position corresponding to the delivery portion to pressurize the delivery portion when the filter is reciprocally moved.

20. A filter cleaning device configured to clean a filter by moving the filter, comprising:
   a frame configured to form a section at which the filter is moved;
   a driving member configured to move the filter from one side of the frame to an other side thereof;
   a brush located at an inward side of the frame and arranged within a section of a reciprocal movement of the filter to eliminate dust of the filter by coming in contact with the filter when the filter is moved; and
   a dust elimination rib spaced apart from the brush to eliminate dust collected at the brush,
   wherein the brush is provided to be rotatable, and the dust elimination rib comes in contact with the brush being rotated to eliminate the dust collected at the brush when a movement of the filter to the other side of frame is completed, and
   wherein the filter includes a protrusion configured to protrude toward one side of the filter and a movement direction of the filter is changed when the protrusion and one side of a dust elimination cover come in contact with each other.

* * * * *